(12) United States Patent
Jung et al.

(10) Patent No.: US 12,190,763 B2
(45) Date of Patent: Jan. 7, 2025

(54) ELECTRONIC DEVICE INCLUDING FLEXIBLE DISPLAY AND OPERATION METHOD THEREOF

(71) Applicant: SAMSUNG ELECTRONICS CO., LTD., Suwon-si (KR)

(72) Inventors: Hanchul Jung, Suwon-si (KR); Sanghyuk Koh, Suwon-si (KR); Joseph Kim, Suwon-si (KR); Bonghak Choi, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 157 days.

(21) Appl. No.: 17/964,689

(22) Filed: Oct. 12, 2022

(65) Prior Publication Data
US 2023/0114950 A1  Apr. 13, 2023

Related U.S. Application Data

(63) Continuation of application No. PCT/KR2022/015387, filed on Oct. 12, 2022.

(30) Foreign Application Priority Data

Oct. 12, 2021 (KR) .................. 10-2021-0134912
Jan. 28, 2022 (KR) .................. 10-2022-0013255

(51) Int. Cl.
G09G 3/00 (2006.01)
G06T 13/00 (2011.01)

(52) U.S. Cl.
CPC ............ *G09G 3/035* (2020.08); *G06T 13/00* (2013.01); *G09G 2340/0442* (2013.01); *G09G 2340/0464* (2013.01)

(58) Field of Classification Search
None
See application file for complete search history.

(56) References Cited

U.S. PATENT DOCUMENTS 11,960,326 B2 * 4/2024 Kimura ................. G06F 1/1641
2010/0056223 A1   3/2010 Kim et al.
(Continued)

FOREIGN PATENT DOCUMENTS

CN   113287090 A   8/2021
JP   2012502321 A   1/2012
(Continued)

OTHER PUBLICATIONS

International Search Report with Written Opinion issued in International Application No. PCT/KR2022/015387; International Filing Date Oct. 12, 2022; Date of Mailing Jan. 9, 2023 (10 pages).

*Primary Examiner* — James A Thompson
(74) *Attorney, Agent, or Firm* — CANTOR COLBURN LLP

(57) ABSTRACT

An electronic device including a flexible display and a method of transitioning a first execution screen of a first application from one screen area of the flexible display to a second screen area are described. The first area may have a first screen ratio, whereas the second area may have a second screen ratio. The transition may be based on a folded/unfolded state of the electronic device. The transition may be triggered based on switching to/from a folded state. Several other screen areas may be used for additional transitions and provide visual effects to provide a seamless user experience through such transitions.

18 Claims, 17 Drawing Sheets

(56) References Cited

U.S. PATENT DOCUMENTS

| | | | |
|---|---|---|---|
| 2010/0079355 A1 | 4/2010 | Kilpatrick et al. | |
| 2013/0227457 A1 | 8/2013 | Kim et al. | |
| 2016/0085319 A1 | 3/2016 | Kim et al. | |
| 2016/0132074 A1 | 5/2016 | Kim et al. | |
| 2017/0147189 A1 | 5/2017 | Ryu et al. | |
| 2018/0359350 A1 | 12/2018 | Kim et al. | |
| 2019/0261519 A1* | 8/2019 | Park | G06F 3/04886 |
| 2020/0264666 A1 | 8/2020 | Itou | |
| 2020/0310492 A1 | 10/2020 | Kim et al. | |
| 2020/0357362 A1 | 11/2020 | Shin et al. | |

FOREIGN PATENT DOCUMENTS

| | | |
|---|---|---|
| JP | 2013258620 A | 12/2013 |
| JP | 2019067309 A | 4/2019 |
| KR | 20110060445 A | 6/2011 |
| KR | 101522882 B1 | 5/2015 |
| KR | 20150109992 A | 10/2015 |
| KR | 20160033507 A | 3/2016 |
| KR | 20160055646 A | 5/2016 |
| KR | 20160080034 A | 7/2016 |
| KR | 20170060519 A | 6/2017 |
| KR | 20180020669 A | 2/2018 |
| KR | 20180134668 A | 12/2018 |
| KR | 20190038516 A | 4/2019 |
| KR | 20200128925 A | 11/2020 |
| KR | 20210074254 A | 6/2021 |
| KR | 102304700 B1 | 9/2021 |

\* cited by examiner

ELECTRONIC DEVICE INCLUDING FLEXIBLE DISPLAY AND OPERATION METHOD THEREOF

CROSS-REFERENCE TO RELATED APPLICATION(S)

This application is a continuation of International Application No. PCT/KR2022/015387 designating the United States, filed on Oct. 12, 2022, in the Korean Intellectual Property Receiving Office and claiming priority to Korean Patent Application No. 10-2021-0134912, filed on Oct. 12, 2021, in the Korean Intellectual Property Office, and to Korean Patent Application No. 10-2022-0013255, filed on Jan. 28, 2022, in the Korean Intellectual Property Office, the disclosures of all of which are incorporated by reference herein in their entireties

TECHNICAL FIELD

The present disclosure relates to an electronic device including a flexible display and an operation method in the electronic device.

BACKGROUND ART

Electronic devices are being developed in various forms for user convenience and provide numerous services, applications, or functions. As the number of services, applications, or functions provided gradually increases, electronic devices require a larger display for providing more screens and displaying additional data.

In recent years, several types of electronic devices (e.g., foldable, slidable, or flexible electronic devices) capable of changing the shape of a housing have been developed to provide a larger display. Such an electronic device may provide portability while also providing a larger display. The electronic device may provide a flexible display in a foldable or bendable form or a slidable or rollable form as the shape of the housing is changed.

DISCLOSURE

Technical Problem

An electronic device may include housings rotatably connected to each other and a flexible display disposed on the housings. The electronic device may display content (e.g., image, video, text, or graphic element, etc.) on the flexible display, based on data obtained by executing and driving applications. The electronic device may display different execution screens (or content) between respective areas of the flexible display corresponding to the respective housings.

However, in recent electronic devices, respective areas of the flexible display are visually disconnected, and the display of an execution screen displayed in one hidden area is stopped as the shape of the electronic device changes, and it is difficult to display the execution screen displayed in one area in another exposed area to provide a continuous and natural experience to a user.

According to an embodiments in this document, an electronic device includes a flexible display for providing screens for applications or functions and an operation method in the device.

Technical Solution

According to an embodiment of this document, an electronic device may include a housing including a first housing structure and a second housing structure, a memory, a display module including a flexible display, and at least one processor electrically connected to the memory and the display module.

According to an embodiment, the at least one processor may be configured to control the display module to display a first execution screen of a first application at a first screen ratio on a first area of the display in an unfolded state of the electronic device.

According to an embodiment, the at least one processor may be configured to change the first screen ratio of the first execution screen into a second screen ratio corresponding to a third area of the display, based on switching to a folded state of the electronic device.

According to an embodiment, the at least one processor may be configured to obtain a first image corresponding to a first execution screen changed to have the second screen ratio.

According to an embodiment, the at least one processor may be configured to control the display module to move the first image to be displayed on the third area by applying a visual effect of moving the first image from the first area to the third area via the second area of the display.

According to an embodiment, the at least one processor may be configured to, based on completion of the movement of the first image, control the display module to display the first execution screen changed to have the second screen ratio on the third area by replacing the first image (which is now displayed on the third area).

According to an embodiment, an operation method in an electronic device may include displaying a first execution screen of a first application at a first screen ratio on a first area of a flexible display of the electronic device in an unfolded state of the electronic device.

According to an embodiment, the method may include changing the first screen ratio of the first execution screen into a second screen ratio corresponding to a third area of the display, based on switching to a folded state of the electronic device.

According to an embodiment, the method may include obtaining a first image corresponding to a first execution screen changed to have the second screen ratio, According to an embodiment, the method may include moving the first image to be displayed on the third area by applying a visual effect of moving the first image from the first area to the third area of the display via the second area of the display.

According to an embodiment, the method may include, based on completion of the movement of the first image, displaying the first execution screen changed to have the second screen ratio on the third area by replacing the first image (on the third area).

Advantageous Effects

According to an embodiment of the present document, an electronic device including a flexible display may obtain an image corresponding to an execution screen displayed in one of the areas of the display that changes according to a folded state or an unfolded state. Further, the electronic device provides a visual effect of such a transition, which includes moving and displaying the image on another area. An execution screen is displayed corresponding to the image that is moved to another area by replacing the image with an execution screen, thereby providing users with a continuous and natural experience making the transition seamless.

DESCRIPTION OF THE DRAWINGS

In connection with the description of drawings, the same or similar reference numerals may be used for the same or similar elements.

MODE FOR INVENTION

Hereinafter, an electronic device according to various embodiments will be described with reference to the accompanying drawings. The term "user" used in various embodiments may indicate the person using an electronic device or the device (e.g., an artificial intelligence electronic device) using an electronic device.

Figure 1:
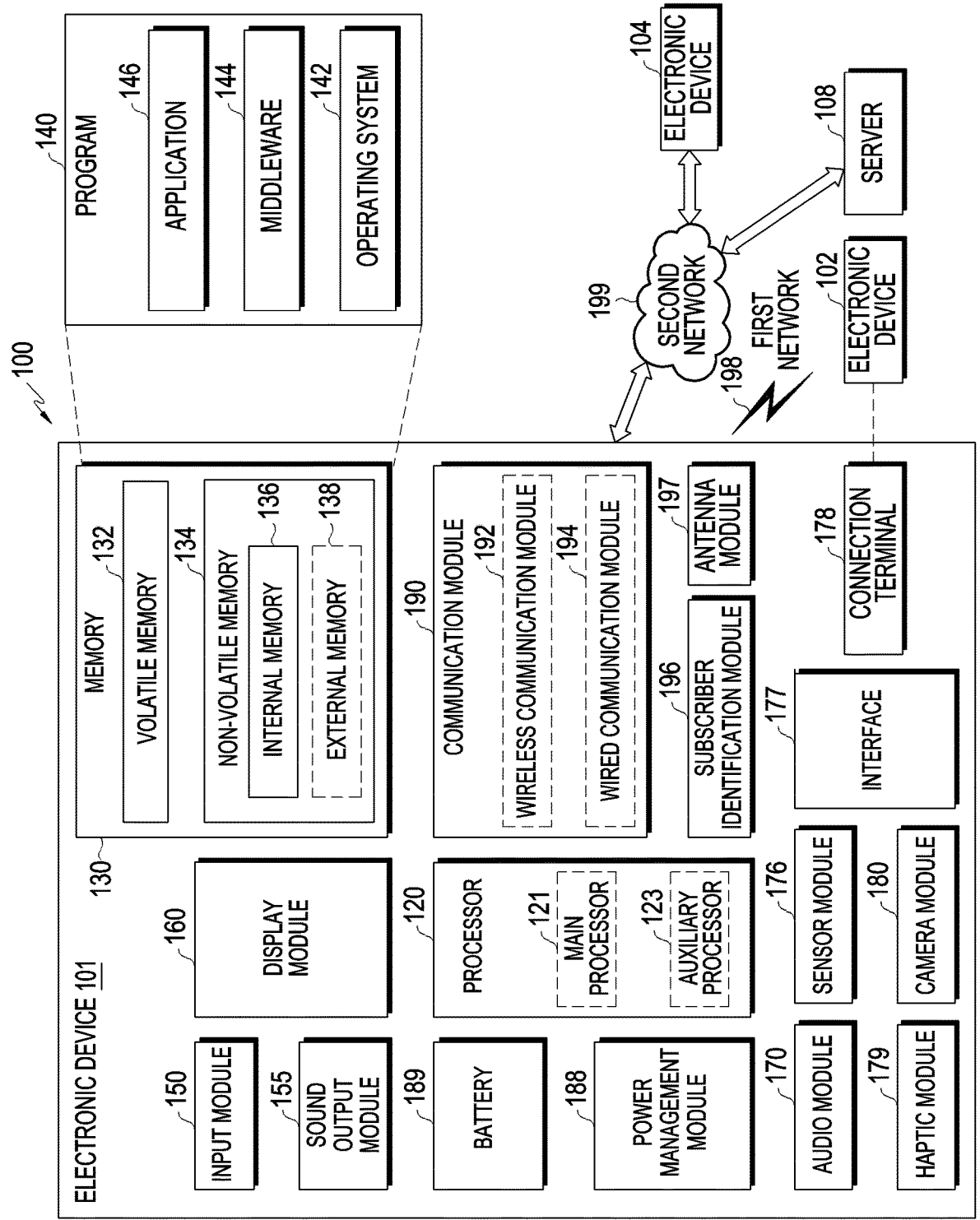
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
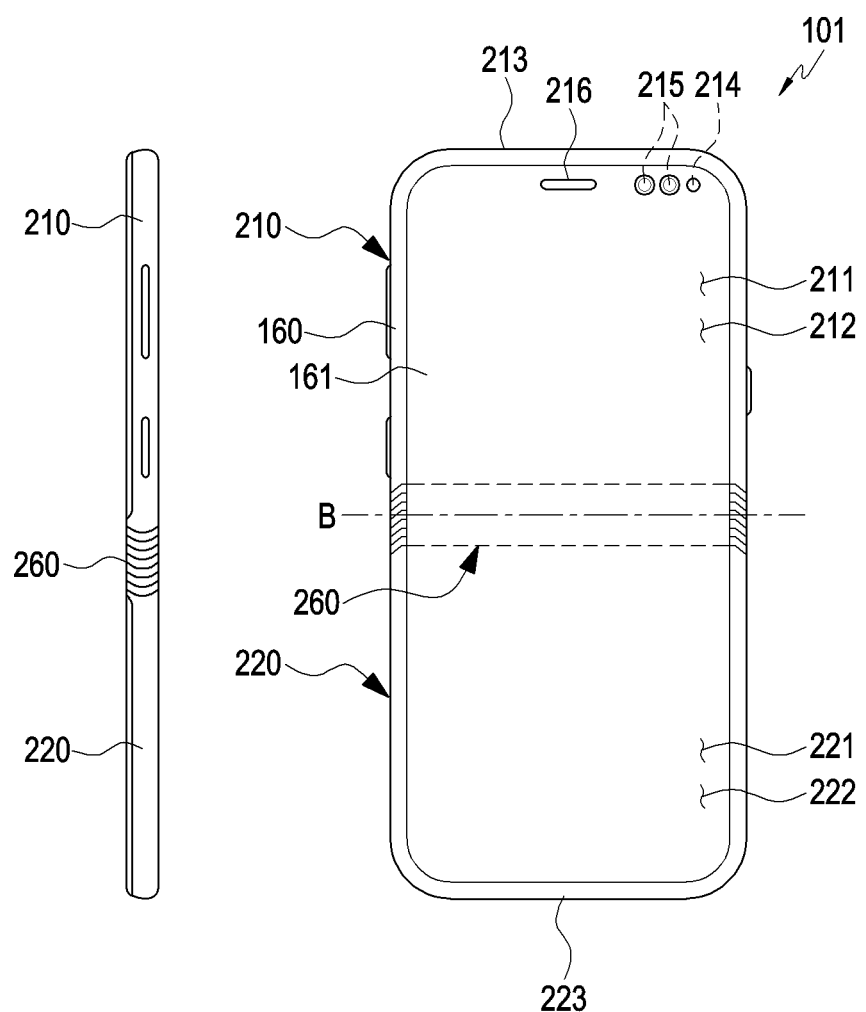
FIG. 2 is a diagram illustrating the structure of an electronic device according to an embodiment.
Figure 3A:
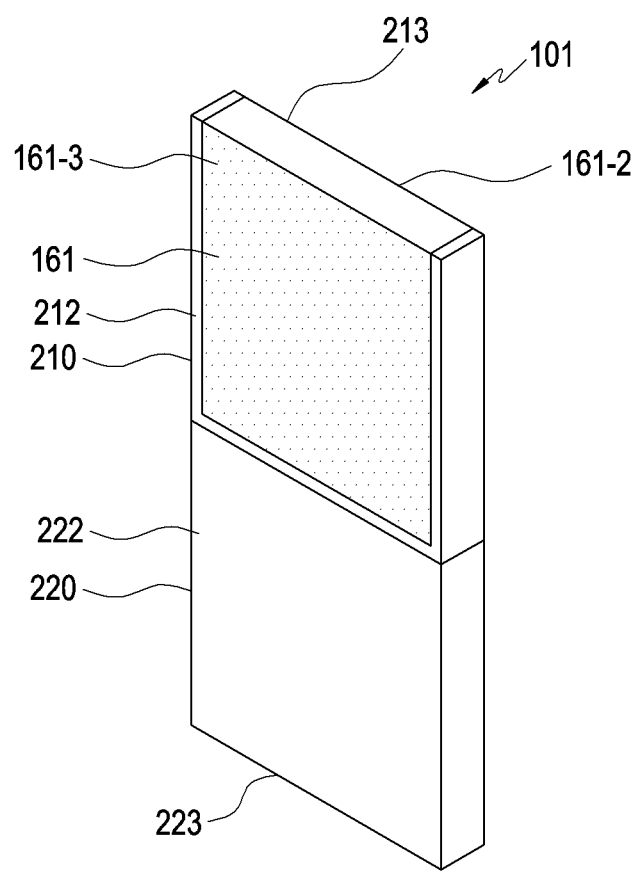
FIGS. 3A and 3B are diagrams illustrating an unfolded state of an electronic device according to an embodiment.
Figure 3B:
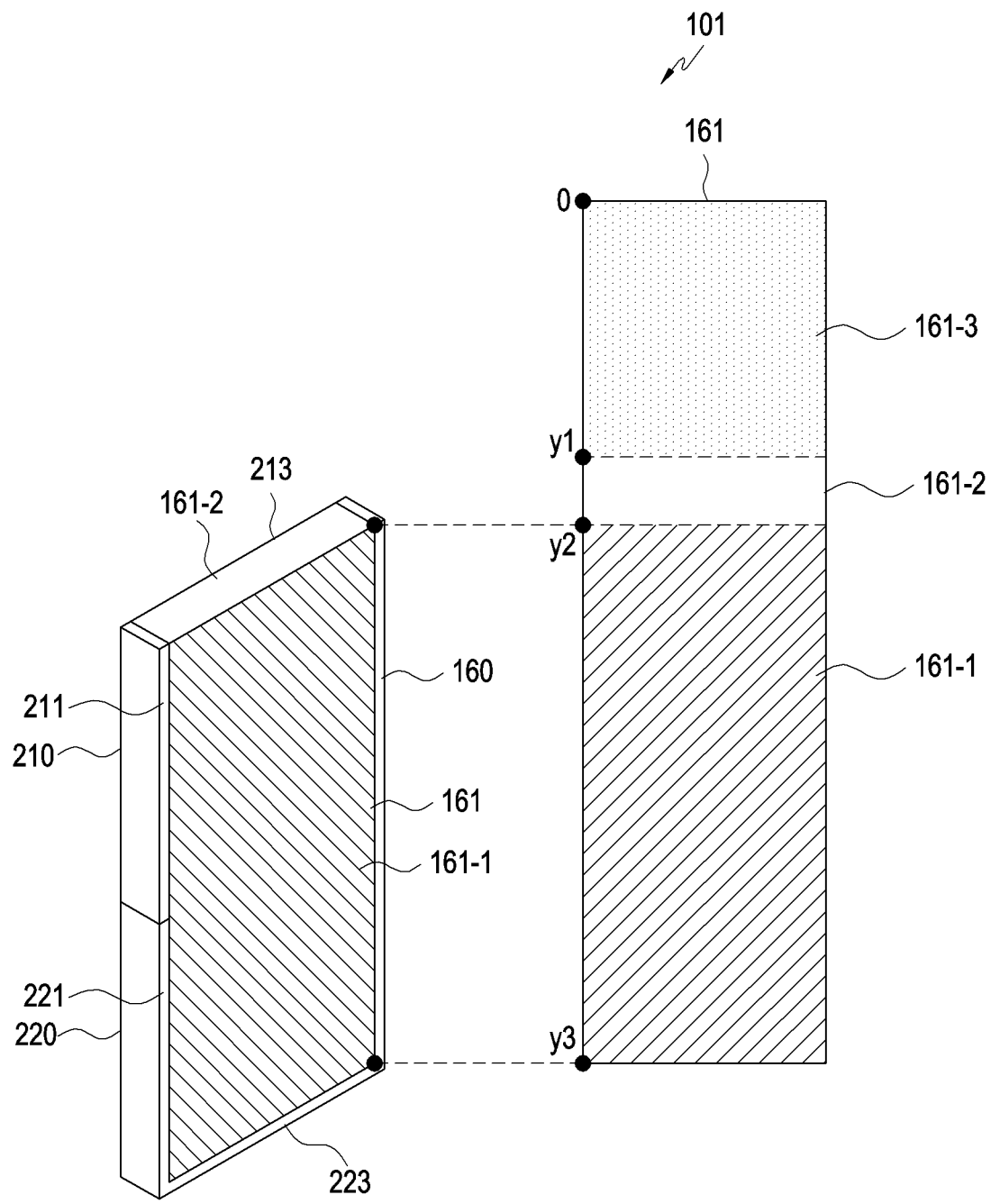
Figure 3C:
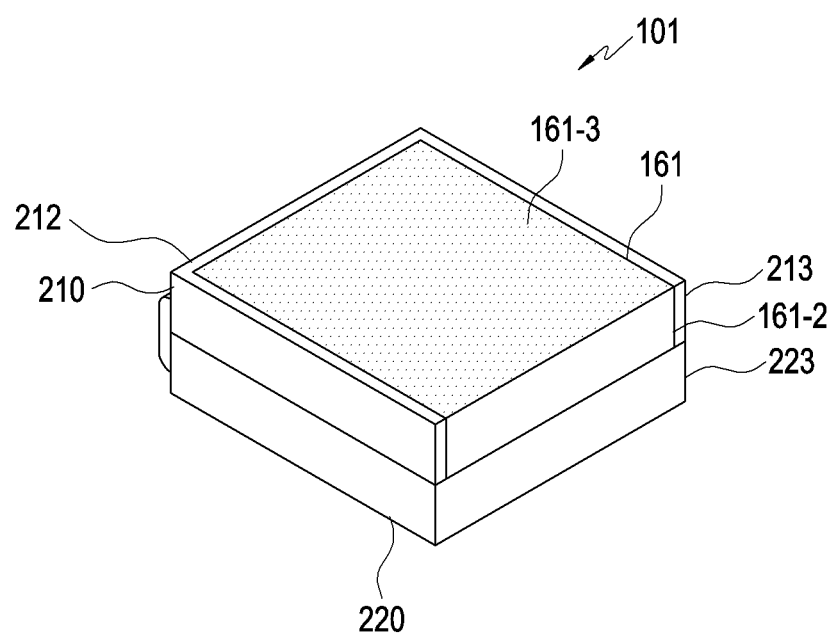
FIG. 3C is a diagram illustrating a closed state of an electronic device according to an embodiment.

FIG. 2 is a diagram illustrating the structure of an electronic device according to an embodiment, FIGS. 3A and 3B are diagrams illustrating an unfolded state of an electronic device according to an embodiment, and FIG. 3C is a diagram illustrating a closed state of an electronic device according to an embodiment.

Referring to FIGS. 2, 3A, 3B, and 3C, an electronic device 101 (e.g., the electronic device 101 in FIG. 1) according to an embodiment may include a housing including a first housing structure 210 and a second housing structure 220, at least one processor 120, a memory 130, and a display module 160. In addition, the electronic device may further include other elements. The electronic device 101 may be configured in a form (e.g., a foldable, slidable, or flexible form) in which the shape of the housing is deformable.

According to an embodiment, the first housing structure 210 and the second housing structure 220 may be disposed on both sides of a folding axis B (e.g., a folding axis in the transverse direction), and may be coupled to rotate about the folding axis B so as to be folded, facing each other, through a hinge structure 260. The disclosure is not limited thereto, and according to another embodiment, the housing of the electronic device 101 may further include another housing structure in addition to the first housing structure 210 and the second housing structure 220 and may be configured to be folded in various ways through a plurality of folding axes. According to another embodiment, the electronic device 101 may be configured such that a partial area of the housing is to be folded in a direction (e.g., the y-axis or longitudinal direction perpendicular to B) different from the folding axis B in FIG. 2.

According to an embodiment, a camera 214 included in a camera module (e.g., the camera module 180 in FIG. 1), various sensors 215, and a speaker (e.g., a receiver) 216 may be disposed in the first housing structure 210. In another embodiment, the camera 214, the various sensors 215, and the speaker 216 may be further disposed or replaced in at least a partial area of the second housing structure 220. According to another embodiment, at least some of the camera 214, the various sensors 215, and the speaker 216 may be disposed in at least a partial area of the first housing 210, and the remaining thereof may be disposed in at least a partial area of the second housing structure 220. The camera 214 may be exposed through an opening provided at one corner of the front surface (e.g., a first surface 211) of the first housing structure 210. The sensors 215 may include at least one of a proximity sensor, an illuminance sensor, an iris recognition sensor, an ultrasonic sensor, and an indicator. For example, the sensors 215 may be exposed to the front surface of the electronic device 101 through an opening provided at one corner of the first housing structure 210 or may be disposed at the bottom of at least a partial area of the display 161. For example, the electronic device 101 may further include a camera (e.g., a rear camera) exposed through an opening provided at one corner of a second surface 212 of the first housing structure 210.

According to an embodiment, although not illustrated, the electronic device 101 may also include an ear jack hole, an external speaker module, a SIM card tray, an interface connector port, or at least one key button, which is disposed in the first housing structure 210 and/or the second housing structure 220.

According to an embodiment, the angle or distance between the first housing structure 210 and the second housing structure 220 may vary depending on whether the electronic device 101 is in an unfolded state (or flat state) (e.g., the unfolded state in FIGS. 3A and 3B), a folded state (or closed state) (e.g., the folded state in FIG. 3C), or an intermediate state (or half-folded state). The term "state" may be replaced with "mode". The intermediate state may indicate a half-folded state in which the first surface 211 of the first housing structure 210 and the first surface 221 of the second housing structure 220 form a specified reference angle (e.g., 90 degrees or a range of 80 to 100 degrees) therebetween. The unfolded state may indicate the state in which the first surface 211 of the first housing structure 210 and the first surface 221 of the second housing structure 220 are being opened such that an angle therebetween exceeds a specified reference angle (e.g., greater than 90 degrees to 180 degrees or greater than 101 degrees to 180 degrees) or are fully opened to be flat (e.g., an angle of 180 degrees). The folded state may indicate the state in which the first surface 211 of the first housing structure 210 and the first surface 221 of the second housing structure 220 are being closed such that an angle therebetween is less than a specified reference angle (e.g., less than 90 degrees to 0 degrees or less than 80 degrees to 0 degrees) or are fully closed to be folded (e.g., 0 degrees).

According to an embodiment, as shown in FIGS. 3A to 3C, the first housing structure 210 and the second housing structure 220 may be configured such that a partial area (hereinafter, referred to as a first area (y2-y3) 161-1) of a flexible display 161 included in the display module 160 is disposed in the first surfaces 211 and 221 (e.g., the front surface) of the housing. As shown in FIGS. 3A and 3B, the first housing structure 210 may be configured such that other areas (hereinafter, referred to as a second area (y1-y2) 161-2 and a third area (0-y1) 161-3) of the display 161 are disposed to surround the second surface 212 (e.g., the rear surface) of the housing, which is directed in the opposite direction of the first surface 211, and a third surface 213 (e.g., the side surface) of the housing in the space between the first surface 211 and the second surface 212. According to another embodiment, the second area 161-2 and the third area 161-3 of the display 161 may be disposed to surround a third surface 223 and a second surface 222 of the second housing structure 220. According to another embodiment, the electronic device 101 may be configured such that another area (hereinafter, referred to as a fourth area) of the display 161 is disposed to extend to the first area 161-1 to surrounding the area corresponding to or similar to the second area 161-2 and the third surface 223 of the second housing structure 220.

According to an embodiment, the processor 120 may perform an operation of displaying an execution screen of an application depending on the state (e.g., the unfolded state, folded state, or intermediate state) of the electronic device 101. In some embodiments, the state of the electronic device is determined according to an angle between the first housing structure 210 and the second housing structure 220. The operation of displaying an execution screen of an application depending on the state of the electronic device 101 will be described later.

According to an embodiment, the processor 120 may be a hardware element (function) including at least one of various elements included in the electronic device 101, or a software element (program). The processor 120 may execute one or more application programs.

According to an embodiment, the processor 210 may include, for example, hardware, software, or firmware, or a combination thereof. The processor 210 may be configured to exclude at least some of the elements or further include other elements for performing an image processing operation, in addition to the elements.

According to an embodiment, the memory 130 may store a variety of data used by at least one element (e.g., the processor 210) of the electronic device 101 and commands to perform operations executed by the processor 210. For example, the memory 130 may store applications (functions or programs) that cause execution screens to be displayed on the corresponding areas of the display 161 depending on the unfolded (open), folded (closed), or intermediate (partially-open/partially-closed) state of the electronic device 101. The memory 130 may store programs (e.g., the programs 140 in FIG. 1) used for functional operation and a variety of data produced during the execution of the programs 140. The memory 130 may largely include a program area and a data area (not shown). The program area 140 may store related program information for driving the electronic device 201, such as an operating system (OS) (e.g., the operating system 142 in FIG. 1), and/or other programs for booting the electronic device 201. The data area (not shown) may store transmitted and/or received data and produced data according to various embodiments. In addition, the memory 130 may be configured to include at least one storage medium among a flash memory, a hard disk, a multimedia card micro-type memory (e.g., a secure digital (SD) or extreme digital (XD) memory), RAM, and ROM. According to an embodiment, the memory 130 may store an image corresponding to an execution screen of at least one application displayed on the corresponding area of the display 161 depending on the state of the electronic device.

According to an embodiment, the display module 160 may include a flexible display 161. When displaying execution screens of applications in configured areas of the display 161, the display module 160 may determine a screen ratio of the execution screen of the application to be displayed according to the size, the resolution, and the ratio of the horizontal length to the vertical length of each of the configured areas. Here, the screen ratio of the execution screen of the application to be displayed on the corresponding area may be determined based on screen ratio information configured by the display module 160 under the control of at least one processor 120 or configured by at least one processor 120.

According to an embodiment, as shown in FIGS. 3A and 3B, the display 161 may be configured in a first shape in the unfolded state of the electronic device 101. As shown in FIG. 3C, the display 161 may be configured in a second shape in the folded state of the electronic device 101. For example, the first shape may include a first screen ratio (e.g., 16:9), and the second shape may include a second screen ratio (e.g., 4:3). The display 161 may include a first area 161-1 that is a main area, a second area 161-2 that is a sub area, and a third area 161-3. The first area 161-1 of the display 161 may be disposed in the first shape with the first screen ratio. The first area 161-1 may be disposed on the first surface 211 of the first housing structure 210 and the first surface 221 of the second housing structure 220. As shown in FIG. 3B, the second area 161-2 of the display 161 may be disposed to extend to a point y2 and surround, envelop, or encompass the third surface 213 of the first housing structure 210. The third area 161-3 of the display 161 may be disposed to extend to a point y1 and surround, envelop, or encompass the second surface 212 of the first housing structure 210. As another example, the second area 161-2 of the display 161 may extend from a point y3 of the first area 161-2 to be disposed on the third surface 223 of the second housing structure 220. The third area 161-3 may extend to the second area 161-2 to be disposed on the second surface 222 of the second housing structure 220. As another example, the display 161 may further include a fourth area (not shown) disposed on the second surface 212 of the first housing structure 210 and the third surface 223 of the second housing structure 220 so as to be combined with the second area 161-2 in the folded state of the electronic device 101, thereby displaying an execution screen of an application.

According to another embodiment, a portion of the display 161 (e.g., the second area 161-2 and the third area 161-3 of the display 161) may be configured in a rollable form capable of being rolled into the electronic device or in a sliding form capable of being pushed into the electronic device. For example, a portion of the display 161 (e.g., the second area 161-2 and the third area 161-3 of the display 161) may be configured to be rolled or pushed into the electronic device 101 through an opening formed at one side of the third surface 213 of the first housing structure 210 or the third surface 223 of the second housing structure 220 and to be extended to the first area 161-1 by expanding the area inserted into the electronic device. The electronic device 101 may be configured such that the area inserted thereinto is unfolded when using the electronic device so as to surround, or envelop, the second surface 212 of the first housing structure 210 or the second surface 222 of the second housing structure 220 and the third surface 213 of the first housing structure 210 or the third surface 223 of the second housing structure 220.

According to an embodiment, the electronic device 101 may include a motion sensor and a magnetic body (e.g., magnet) included in a sensor module (e.g., the sensor module 176 in FIG. 1). The motion sensor and the magnetic body (e.g., the magnet) may be disposed in at least a portion of the first housing structure 210. The motion sensor may be configured as a combination of at least two of an acceleration sensor, an angular velocity sensor (e.g., a gyro sensor), or a geomagnetic sensor. For example, the electronic device 101 may detect the pose and gesture of the first housing structure 210 through the motion sensor. For example, the pose of the first housing structure 210 may be detected based on the acceleration sensor of the motion sensor, and the movement of the first housing structure 210 may be detected based on the angular velocity sensor of the motion sensor. According to an embodiment, the magnetic body may be disposed in at least a portion of the first housing structure 210 adjacent to the hinge structure 260.

According to an embodiment, the electronic device 101 may include a motion sensor and a magnetic sensor module, which are disposed in at least a portion of the second housing structure 220 and included in a sensor module (e.g., the sensor module 176 in FIG. 1). According to an embodiment, the motion sensor disposed in at least a portion of the second housing structure 220 may be configured as a combination of at least two of an acceleration sensor, an angular velocity sensor (e.g., a gyro sensor), or a geomagnetic sensor. For example, the electronic device 101 may detect the pose of the second housing structure 220 through the acceleration sensor of the motion sensor and detect the movement of the second housing structure 220 through the angular velocity sensor. The magnetic sensor module may be disposed in at least a portion of the second housing structure 220 adjacent to the hinge structure 260. For example, as shown in FIG. 3C, the magnetic body of the first housing structure 210 and the magnetic sensor module of the second housing structure 220 may be disposed to face, at least in part, each other in the folded state of the electronic device 101.

Figure 4A:
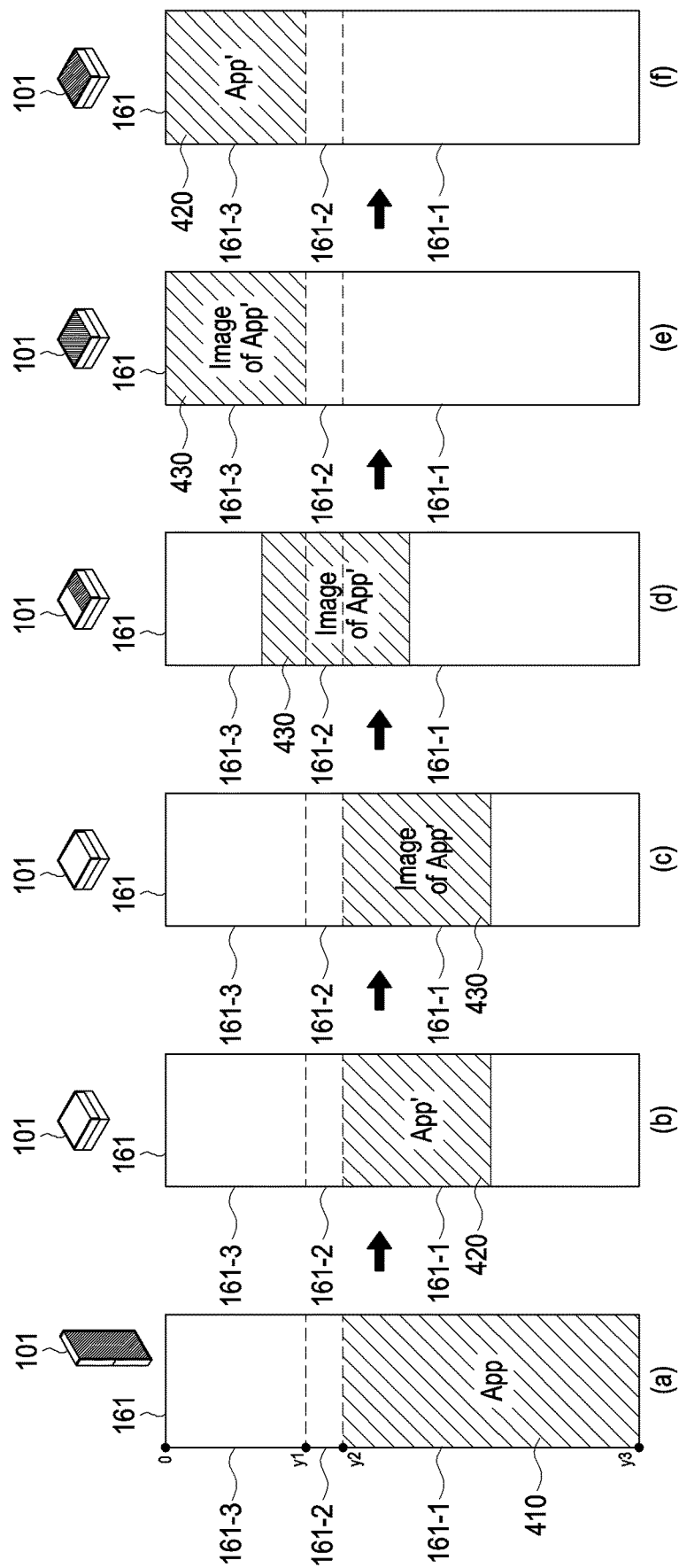
FIGS. 4A and 4B are diagrams illustrating an example of displaying an execution screen depending on the state of an electronic device according to an embodiment.

FIG. 4A is a diagram illustrating an example of displaying an execution screen depending on the state of a foldable electronic device according to an embodiment.

Referring to FIGS. 2 and 4A, as shown in (a) of FIG. 4A, the processor 120 of the electronic device 101 according to an embodiment may control the display module 160 to display an execution screen 410 (hereinafter, referred to as a first execution screen) of an application (hereinafter, referred to as a first application) at a first screen ratio on the first area (y2-y3) 161-1 of the display 161 in the unfolded state of the electronic device 101. In some embodiments, the first screen ratio may be configured to have a size (or the area) corresponding to or similar to the first area (y2-y3) 161-1 of the display 161.

According to an embodiment, as shown in (b) of FIG. 4A, based on switching to the folded state, the processor 120 may change the first screen ratio of the first execution screen 410 (e.g., App) displayed on the first area 161-1 into a second screen ratio to obtain a first execution screen 420 (e.g., App') at the second screen ratio. For example, when the first housing structure 210 and the second housing structure 220 are detected to be fully folded to face each other using at least one sensor (e.g., a proximity sensor), the processor 120 may change the first execution screen 410 at the first screen ratio into the first execution screen 420 at the second screen ratio. As another example, when the angle between the first housing structure 210 and the second housing structure 220 with respect to the folding axis B is detected to be less than a specified reference angle using at least one sensor (e.g., a proximity sensor), the processor 120 may change the first execution screen 410 at the first screen ratio into the first execution screen 420 at the second screen ratio.

According to an embodiment, as shown in (c) of FIG. 4A, when the angle between the first housing structure 210 and the second housing structure 220 is detected to be less than a specified reference angle using at least one sensor, the processor 120 may identify that the display 161 switched to the folded state and capture the changed first execution screen 420, thereby producing a first image 430 (e.g., the image of App') having a size corresponding to the second screen ratio. The second screen ratio may be configured as a size (or the area) corresponding or similar to the third area (0-y1) 161-3 of the display 161. For example, the second screen ratio may be smaller than the first screen ratio.

According to an embodiment, as shown in (c) of FIG. 4A, the processor 120 may control the display module 160 to display the first image 430 obtained in the folded state on a portion at the first area 161-1 of the display 161. The first area 161-1 of the display 161 may not be exposed in the folded state of the electronic device, and the first image 430 may be displayed in a portion in the active state thereof, and if a visual effect in which the first image 430 moves is displayed and if the movement of the first image 430 is completed, the first area may switch to an inactive state. For example, in (c) of FIG. 4A, the second area 161-2 and the third area 161-3 of the display 161 may be in an inactive state. As another example, the second area 161-2 and the third area 161-3 of the display 161 may be activated when the first image 430 is displayed in a portion of the first area 161-1.

According to an embodiment, as shown in (d) and (e) of FIG. 4A, the processor 120 may control the display module 160 to display a visual effect in which the first image 430 moves from a portion of the first area 161-1 of the display 161 to the third area 161-3 (y1-0) via the second area 161-2 (y2-y1) of the display 161 in the folded state. For example, as shown in (d) of FIG. 4A, the second area 161-2 and the third area 161-3 of the display 161 may switch to an active state as the first image 430 starts to move. The processor 120 may display the first image 430 by applying the visual effect in which the produced first image 430 moves, instead of moving and adjusting content of the first execution screen 420 to the second screen ratio. This addresses a technical challenge. Because, if elements of the content of the application is moved, the screen of the application, which is displayed in every frame, has to be refreshed, thereby increasing resource usage of the display. Accordingly, when switching from the unfolded state to the folded state, the processor 120 may display the first image 430 obtained by capturing the first execution screen 420 by applying a visual effect (e.g., an animation effect) of moving the image 430, instead of depicting movement of content of the application. For example, the processor 120 may display the first image 430 by applying a visual effect in which the first image moves at a specified speed (e.g., a constant speed or an increasing speed) from a portion of the first area 161-1 to the third area 161-3 (y1-0) via the second area 161-2 (y2-y1). For example, the processor 120 may display the first image 430 by applying a visual effect in which the first image is gradually enlarged while moving to the third area 161-3 (y1-0). As another example, the processor 120 may display the first image 430 by applying a visual effect in which the first image is gradually reduced while moving to the third area 161-3 (y1-0) and display the first execution screen 420 while gradually enlarging the same in response to the reduction effect. The disclosure is not limited thereto, and the processor 120 may display the first image 430 by applying various other visual effects.

According to an embodiment, when the movement of the first image 430 to the point 0 is completed as shown in (e) of FIG. 4A, the processor 120 may control the display module 160 to remove the first image 430 applied with the visual effect and display (again) the first execution screen 420 (e.g., App') at the second screen ratio on the third area 161-3 as shown in (f) of FIG. 4A. Here, the first execution screen 420 at the second screen ratio may be a refreshed screen of the application and may be displayed at the second screen ratio corresponding to the size (e.g., the size from 0 to y1) of the third area 161-3.

According to an embodiment, when displaying the first execution screen 420 on the third area 161-3 in the folded state as shown in FIG. 3C and (f) of FIG. 4A, the processor 120 may control the display module 160 to display another execution screen related to the first application, the second execution screen of the second application, or an object related to at least one application (e.g., an execution icon or content including images, text, or symbols) on the second area 161-2.

According to an embodiment, as shown in FIG. 3B and (a) of FIG. 4A, the processor 120, in the unfolded state, may control the display module 160 to display the first execution screen of the first application in a portion of the first area 161-1 and to display the second execution screen of the second application in another portion of the first area 161-1. As shown in FIG. 3C and (b) to (d) of FIG. 4A, when switching to the folded state, the processor 120 may control the display module 160 to move the first image corresponding to the first execution screen of the first application to the third area 161-3 via the second area 161-2 and display the same thereon, and to move the second image corresponding to the second execution screen of the second application to the second area 161-2 and display the same thereon. As shown in (e) of FIG. 4A, when the movement of the first image and the second image is completed, the processor 120 may display the first execution screen corresponding to the first image on the third area 161-3 and display the second execution screen corresponding to the second image on the second area 161-2. The first execution screen may be changed to have the second screen ratio, and the first image may be an image corresponding to the first execution screen changed to have the second screen ratio. The second execution screen may be changed to have the third screen ratio, and the second image may be an image corresponding to the second execution screen changed to have the third screen ratio. For example, the third screen ratio may be smaller than the second screen ratio.

According to an embodiment, if a user interaction (e.g., a specified gesture, touch, or voice) is input while the first execution screen is displayed on the third area 161-3 and while the second execution screen is displayed on the second area 161-2, the processor 120 may control the display module 160 to display the second execution screen on the third area 161-3 and to display the first execution screen on the second area 161-2.

Figure 4B:
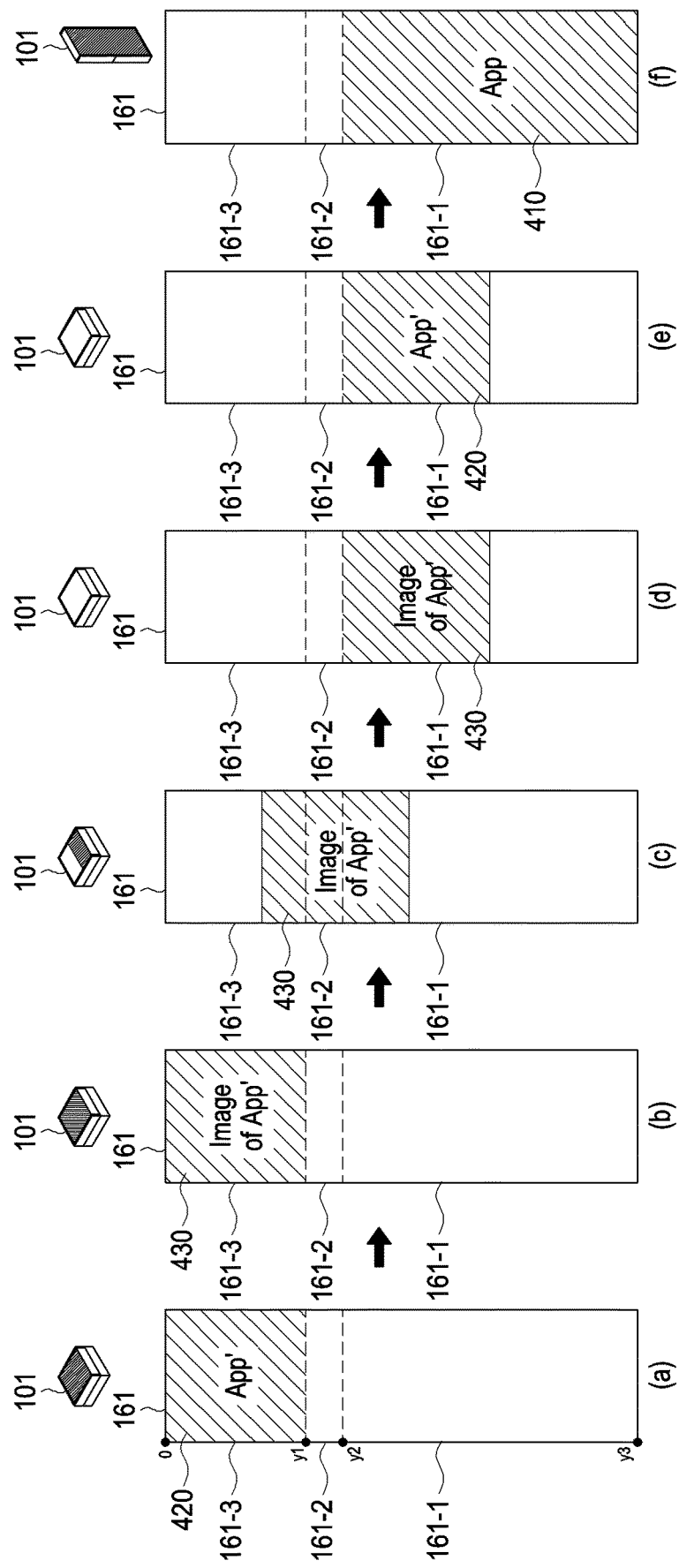

FIG. 4B is a diagram illustrating an example of displaying an execution screen depending on the state of a foldable electronic device according to an embodiment.

Referring to FIGS. 2 and 4B, the processor 120 of the electronic device 101 according to an embodiment may control the display module 160 to display a first execution screen 420 at the second screen ratio disposed in the third area (0-y1) 161-3 of the display 161 in the folded state of the electronic device 101 as shown in (a) of FIG. 4B. As shown in (a) of FIG. 4B, when the electronic device 101 is in the folded state, the first area 161-1 may be in an inactive state. Here, the first execution screen 420 may include the same or different content (or objects) as the first execution screen 420 described with reference to FIG. 4A. For example, the processor 120 may display another execution screen related to a first application or an execution screen of another application on the second area 161-2.

According to an embodiment, based on switching to the unfolded state, the processor 120 may obtain a first image 430 corresponding to the first execution screen 420 as shown in (b) of FIG. 4B. The first image 430 may be an image at a second screen ratio obtained by photographing (e.g., capturing) the first execution screen 410. For example, if the angle between the first housing structure 210 and the second housing structure 220 is detected to be greater than or equal to a specified reference angle using at least one sensor (e.g., a proximity sensor), the processor 120 may identify the unfolded state of the display 161 and obtain a first image 430

(e.g., the image of App') corresponding to the currently displayed first execution screen 420 (e.g., App') at the second screen ratio. Here, the first image 430 may include the same or different content (or objects) from the first image 430 described with reference to FIG. 4A. The processor 120 may control the display module 160 to display the first image 430 obtain in the unfolded state on the third area 161-3 of the display 161. For example, when another execution screen related to the first application or an execution screen of another application is displayed on the second area 161-2, the processor 120 may obtain another image corresponding to another execution screen related to the first application or the execution screen of another application.

According to an embodiment, as shown in (c) and (d) of FIG. 4B, the processor 120 may control the display module 160 to display the first image 430 by applying a visual effect in which the first image moves from the third area (0-y1) 161-3 of the display 161 to the first area 161-1 (y2-y3) via the second area (y1-y2) 161-2 in the unfolded state. When the electronic device 101 detects the unfolded state or identifies the movement of the first image 430, the processor 120 may switch the first area 161-1 to an active state. For example, when another execution screen related to the first application or an execution screen of another application is displayed on the second area 161-2, the processor 120 may display a visual effect in which another image corresponding to another execution screen related to the first application or the execution screen of another application moves simultaneously with, sequentially after, or separately from the first image. The processor 120 may display the first image 430 by applying the visual effect in which the produced first image 430 moves, instead of at least one piece of content of the application displayed on the first execution screen 420 at the second screen ratio. When switching from the unfolded state to the folded state, the processor 120 may display the first image 430 obtained by capturing the first execution screen 420 by applying a visual effect (e.g., an animation effect) of moving the same, instead of at least one piece of content of the application displayed on the first execution screen 420. For example, the processor 120 may display the first image 430 by applying a visual effect in which the first image moves at a specified speed (e.g., a constant speed or an increasing speed) from a portion of the first area 161-1 to the third area 161-3 (y1-0) via the second area 161-2 (y2-y1). For example, the processor 120 may display the first image 430 by applying a visual effect in which the first image is gradually enlarged while moving to the third area 161-3 (y1-0). As another example, the processor 120 may display the first image 430 by applying a visual effect in which the first image is gradually reduced while moving to the third area 161-3 (y1-0) and display the first execution screen 420 at the second screen ratio while gradually enlarging the same in response to the reduction effect. The disclosure is not limited thereto, and the processor 120 may display the first image 430 by applying various visual effects.

According to an embodiment, when the movement of the first image 430 is completed as shown in (e) of FIG. 4B, the processor 120 may control the display module 160 to remove the first image 430 applied with the visual effect and in its place display the first execution screen 420 (e.g., App') at the second screen ratio on a portion of the first area 161-1 of the display 161. The processor 120, as shown in (f) of FIG. 4B, may control the display module 160 to change the size of the first execution screen 420 to the first screen ratio and then display the first execution screen 410 changed to the first screen ratio on the first area 161-1 of the display. For example, when another execution screen related to the first application or an execution screen of another application is displayed on the second area 161-2, the processor 120 may control the display module 160 to display another execution screen related to the first application or an execution screen of another application corresponding to another moved image on the first area 161-1 together with the first execution screen 410. For example, when the movement of the first image 430 is completed, the processor 120 may switch the second area 161-2 and/or the third area 161-3 to an inactive state. As another example, the processor 120 may maintain an active state and control the display module 160 to display another execution screen related to the first application or an execution screen of another application on the second area 161-2 and/or the third area 161-3.

Referring to FIGS. 2, 4A, and 4B, when a screen of an always-on display (AOD) is displayed on the third area 161-3 of the display 161 in the folded state, the processor 120 according to an embodiment may control the display module 160 to change the first execution screen 410 of the first application to have the third screen ratio and then display the same on the second area 161-2.

Referring to FIGS. 2, 4A, and 4B, in the case where a fourth area of the display 161 is disposed on the third surface 213 of the first housing structure 210 and the third surface 223 of the second housing structure 220 and where an always-on display (AOD) is displayed on the third area 161-3 of the display 161, the processor 120 according to an embodiment may change the first execution screen 410 of the first application to have a fourth screen ratio and display the same on the fourth area of the display 161. For example, the fourth screen ratio may be smaller than the second screen ratio and greater than the third screen ratio. According to an embodiment, in the case where the fourth area of the display 161 is disposed on the third surface 223 of the second housing structure 220 and where an always-on display (AOD) is displayed on the third area 161-3 of the display 161, the processor 120 according to an embodiment may control the display module 160 to change the first execution screen 410 of the first application to have the third screen ratio and then display the same on a first portion of the fourth area of the display 161, and to change the second execution screen of the second application to have the third screen ratio and then display the same on a second portion of the fourth area. Here, the fourth area of the display 161 may include the second area 161-2, and a portion corresponding to the second area 161-2 may be disposed on the third surface 213 of the first housing structure 210, and the remaining other portions may be disposed on the third surface 223 of the second housing structure 220.

As described above, in an embodiment, the main elements of the electronic device have been described with reference to the electronic device 101 in FIGS. 1 and 2. However, in various embodiments, not all of the elements shown in FIGS. 1 and 2 are essential elements, and the electronic device 101 may be implemented using more or fewer elements than the illustrated elements. In addition, the positions of the main elements of the electronic device 101 described above with reference to FIGS. 1 and 2 may vary depending on various embodiments.

According to an embodiment, an electronic device (e.g., the electronic device 101 in FIGS. 1 and 2) may include a housing including a first housing structure (e.g., the first housing structure 210 in FIG. 2) and a second housing structure (e.g., the second housing structure 220 in FIG. 2), a memory (e.g., the memory 130 in FIG. 1), a display module (e.g., the display module 160 in FIG. 1) including a flexible display (e.g., the display 161 in FIG. 2), and at least one processor (e.g., the processor 120 in FIG. 1) electrically connected to the memory and the display module. According to an embodiment, the at least one processor may be configured to control the display module to display a first execution screen of a first application at a first screen ratio on a first area of the display in an unfolded (i.e., open, or first) state of the electronic device. According to an embodiment, the at least one processor may be configured to change the first screen ratio of the first execution screen into a second screen ratio corresponding to a third area of the display, based on switching to a folded (i.e., closed, or second) state of the electronic device. According to an embodiment, the at least one processor may be configured to obtain a first image corresponding to the first execution screen changed to have the second screen ratio, control the display module to move and display the first image to and on the third area by applying a visual effect of moving the first image from the first area to the third area of the display via the second area of the display. According to an embodiment, the at least one processor may be configured to, based on completion of the movement of the first image, control the display module to display the first execution screen changed to have the second screen ratio on the third area by replacing the first image.

According to an embodiment, the first area of the display may be disposed on a first surface of the first housing structure and a first surface of the second housing structure. The second area of the display may be disposed on a third surface of the first housing structure. The third area of the display may be disposed on a second surface of the first housing structure. The folded state may be a state in which the housing is closed. For example, in the case of a foldable device, the first surface of the first housing structure and the first surface of the second housing structure are face each other. Alternatively, in a slide-able device, the first surface is slid inside to close the device. In other types of devices, the closed state can be achieved in other manners.

According to an embodiment, the at least one processor may be configured to display, on the second area, a screen including another execution screen related to the first application, a second execution screen of a second application, or an object (e.g., an execution icon or content including images, text, or symbols) related to at least one application in the folded state.

According to an embodiment, the at least one processor may be configured to control the display module to display the first execution screen of the first application at the first screen ratio on the first area in the unfolded state, control the display module to display the first execution screen changed to have the second screen ratio on a portion of the first area, based on switching to the folded state, and obtain the first image by capturing the changed first execution screen.

According to an embodiment, the at least one processor may be configured to control the display module to display a second execution screen of a second application on a portion of the first area in the unfolded state, change the second execution screen to have a third screen ratio, based on switching to the folded state, control the display module to display a second image corresponding to the second execution screen changed to have the third screen ratio on the second area by applying a visual effect of moving the second image from the portion of the first area to the second area, and, based on completion of the movement of the second image to the second area, control the display module to display the second execution screen changed to have the third screen ratio on the second area by replacing the second image.

According to an embodiment, the at least one processor may be configured to control the display module, in response to receiving a user input, to display the first execution screen displayed on the third area on the second area and to display the second execution screen displayed on the second area on the third area, wherein the first execution screen displayed on the second area may be changed to have the third screen ratio, and wherein the second execution screen displayed on the third area may be changed to have the second screen ratio.

According to an embodiment, the at least one processor may be configured to control the display module to change the first execution screen of the first application to have a third screen ratio and display the first execution screen of the first application changed to have the third screen ratio on the second area when a screen of an always-on display is displayed on the third area.

According to an embodiment, the at least one processor may be configured to control the display module to change the first execution screen of the first application to have a fourth screen ratio and display the first execution screen of the first application to have the fourth screen ratio on a fourth area of the display when a screen of an always-on display is displayed on the third area, wherein the fourth area of the display may include the second area, wherein a portion of the fourth area corresponding to the second area may be disposed on a third surface of the first housing structure, and wherein the remaining other portions of the fourth area may be disposed on a third surface of the second housing structure. For example, the fourth screen ratio may be smaller than the second screen ratio and greater than the third screen ratio.

According to an embodiment, the at least one processor may be configured to control the display module to change the first execution screen of the first application to have a third screen ratio and display the first execution screen of the first application changed to have the third screen ratio on a first portion of a fourth area of the display, and to change the second execution screen of the second application to have the third screen ratio and display the second execution screen of the second application changed to have the third screen ratio on a second portion of the fourth area when a screen of an always-on display is displayed on the third area, wherein the fourth area of the display may include the second area, wherein a portion of the fourth area corresponding to the second area may be disposed on a third surface of the first housing structure, and wherein the remaining other portions of the fourth area may be disposed on a third surface of the second housing structure.

According to an embodiment, the at least one processor may be configured to control the display module to display the first image corresponding to the first execution screen displayed on the third area by moving the first image to the first area via the second area when switching from the folded state to the unfolded state, and when the movement of the first image is complete, control the display module to display the first execution screen on the first area by replacing the first image, wherein the first execution screen displayed on the third area may be displayed at the second screen ratio, and wherein the first execution screen displayed on the first area may be displayed at the first screen ratio.

Hereinafter, an operation method in the electronic device will be described with reference to the above-described drawings (e.g., FIGS. 1, 2, 3A to 3C, 4A, and 4B).

Figure 5:
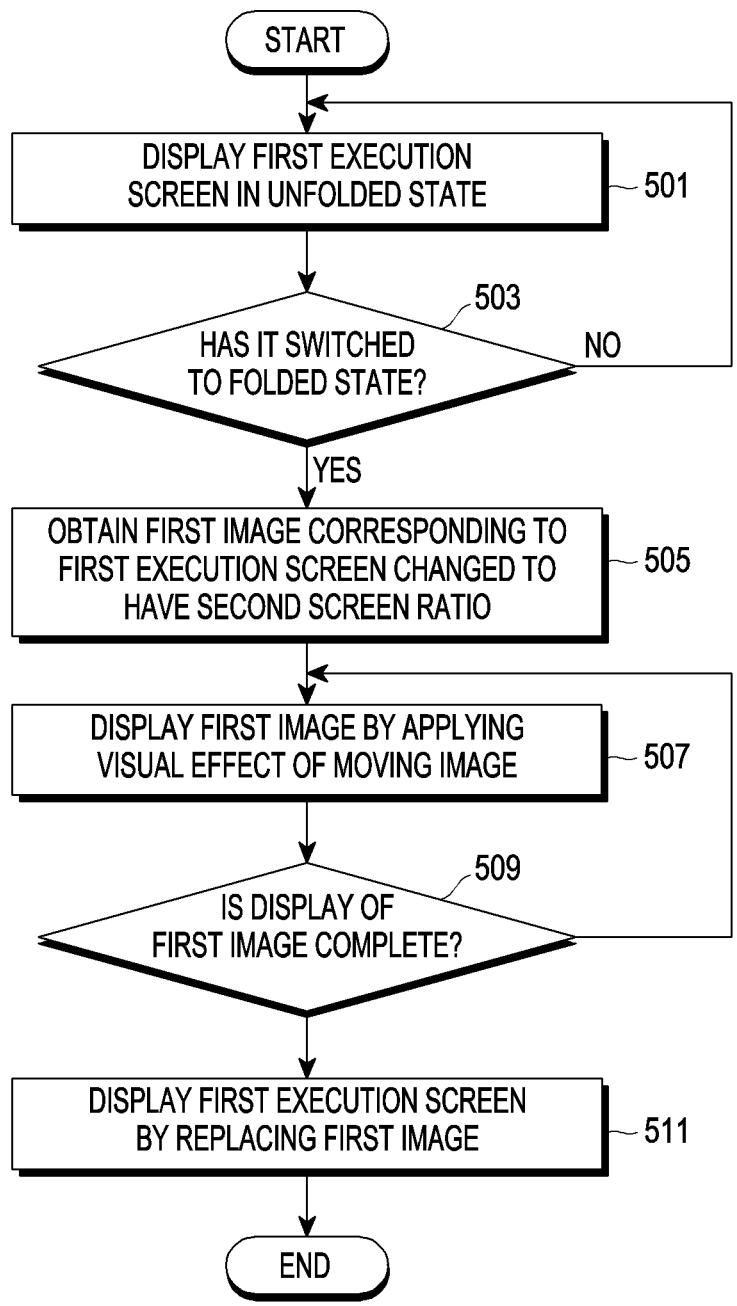
FIG. 5 is a diagram illustrating an example of an operation method in an electronic device according to an embodiment.
Figure 6A:
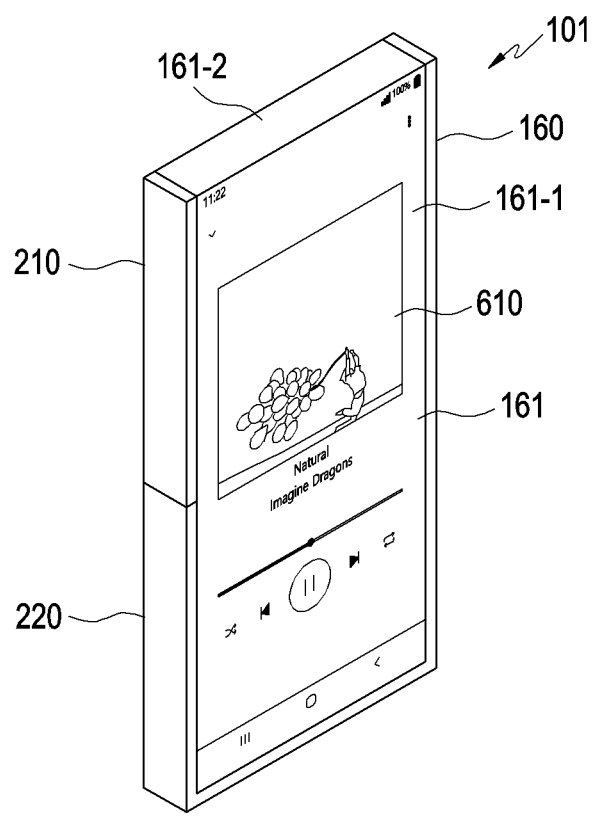
FIGS. 6A, 6B and 6C are a diagram illustrating an example of displaying an execution screen depending on the state of an electronic device according to an embodiment.
Figure 6B:
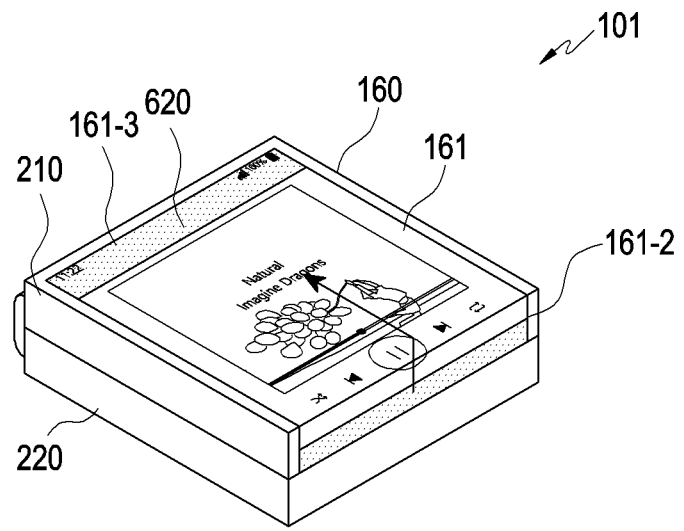
Figure 6C:
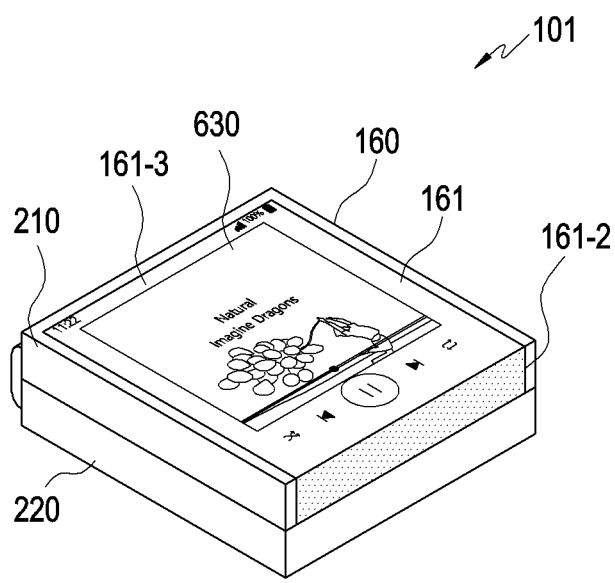

FIG. 5 is a diagram illustrating an example of a method in an electronic device according to an embodiment. FIGS. 6A, 6B and 6C are diagrams illustrating examples of displaying an execution screen depending on the state of an electronic device according to an embodiment.

Referring to FIGS. 5, 6A, 6B and 6C, in operation 501, an electronic device 101 (e.g., the electronic device 101 in FIGS. 1 and 2) according to an embodiment, as shown in FIG. 6A, may display a first execution screen 610 of a first application on the first area 161-1 of a display 161 (e.g., the display 161 in FIG. 2) of a display module (e.g., the display module 160 in FIGS. 1 and 2) in the open, or unfolded state. The electronic device 101 may display the first execution screen 610 of the first application at a first screen ratio on the first area 161-1 (e.g., the area y2 to y3 in FIG. 3B) in the open, or unfolded state. For example, the first execution screen 610 at the first screen ratio may be displayed in a size corresponding to or similar to the size of the first area 161-1.

In operation 503, the electronic device 101 may identify switching to the folded state. As shown in FIG. 6B, if the angle between the first housing structure 210 and the second housing structure 220 is identified to be less than a specified reference angle, the electronic device 101 may identify switching to the closed, or folded state. The angle is detected using at least one sensor (e.g., a proximity sensor). If switching to the closed, or folded state is detected, the electronic device may perform operation 505. On the other hand, if the state does not switch to the closed, or folded state, the electronic device 101 may perform operation 501.

In operation 505, the electronic device 101 may obtain a first image (e.g., a first image 430 of FIG. 4A and FIG. 4B) corresponding to the first execution screen 610 in the folded state. When obtaining the first image 620, the electronic device may change the first execution screen 610 of the first application to have a second screen ratio and display a first execution screen (e.g., a first execution screen 420 of FIG. 4A and FIG. 4B) at the second screen ratio on a portion of the first area 161-1. For example, the second screen ratio may be smaller than the first screen ratio and may be configured as a size corresponding to or similar to the third area 161-3 (e.g., the area 0 to y1 in FIG. 3B) of the display 161. For example, a portion of the first area 161-1 of the display 161 may have a size corresponding to or similar to the size of the first surface of the first housing structure 210. The electronic device 101 may obtain the first image 620 at the second screen ratio by photographing (e.g., capturing) the first execution screen 620 at the second screen ratio. The first image 620 is obtained by performing a screen capture operation in some embodiments.

In operation 507, the electronic device 101 may display the first image 620 using a visual effect in which the first image 620 moves from a portion of the first area 161-1 to the third area 161-3 of the display 161 via the second area 161-2 of the display 161 in the closed, or folded state as shown in FIG. 6B. The electronic device 101 may display the first image 620 by applying a visual effect of moving the captured first image 620, instead of transitioning content of the first execution screen at the second screen ratio. Here, if content of the application is to be displayed while moving the content, the screen of the application, to depict a smooth transition, every frame has to be refreshed, thereby increasing resource consumption by the screen display. Accordingly, when switching from the open, or unfolded state to the closed, or folded state, the electronic device 101 may display the first image 620 obtained by capturing the first execution screen 610 by applying a visual effect (e.g., an animation effect) of moving the first image 620, instead of moving content of the application displayed on the first execution screen at the second screen ratio. The electronic device 101 may display the first image 620 by applying a visual effect in which the first image moves at a specified speed (e.g., a constant speed or an increasing speed) from a portion of the first area 161-1 of the display 161 to the third area 161-3 (y1-0) via the second area 161-2 (y2-y1). In some embodiments, the electronic device 101 may display the first image 620 by applying a visual effect in which the first image is gradually enlarged while moving to the third area 161-3 (y1-0) of the display 161. As another example, the electronic device 101 may display the first image 620 by applying a visual effect in which the first image is gradually reduced while moving to the third area 161-3 (y1-0) of the display 161 and display the first image 620 while gradually enlarging the same in response to the reduction effect. The disclosure is not limited thereto, and the processor 120 may display the first image 620 by applying various visual effects.

In operation 509, the electronic device 101 may identify whether or not the display of the first image 620 is complete after displaying the first image on the third area 161-3 of the display 161 by applying a visual effect of moving the same at a specified speed thereto. For example, when the first image 620 is completely moved and displayed on the third area 161-3, the electronic device 101 may identify that the display of the first image 620 is complete. As another example, the electronic device 101 may identify that the display of the first image 620 is completed when a specified time elapses after the first image 620 is completely moved and displayed on the third area 161-3. If the display of the first image 620 is complete as a result of the identification, the electronic device 101 may perform operation 511. On the other hand, if the display of the first image 620 is not complete, operation 507 may be continuously performed.

In operation 511, as shown in FIG. 6C, based on completion of the movement of the first image 620 to the third area 161-3, the electronic device 101 may display a first execution screen 630 at the second screen ratio corresponding to the first image 620 on the third area 161-3. The electronic device 101 may remove the first image 620 to which the visual effect is applied and display the first execution screen 630 (in its place) on the third area 161-3. Here, the first execution screen 630 at the second screen ratio may be a refreshed screen of the application and may be displayed at the second screen ratio corresponding to the size (e.g., the size from 0 to y1) of the third area 161-3.

According to an embodiment, when switching from the closed, folded state to the open, or unfolded state, the electronic device 101, contrary to the operations in FIGS. 5 and 6, may move a first image 620 corresponding to the first execution screen 630 at the second screen ratio displayed on the third area 161-3 by applying a visual effect of moving the same to the first area 161-1 via the second area 161-2 and display the same thereon. Further, electronic device 101 may display the first execution screen 610 of the first screen ratio on the first area 161-1 by replacing the first image 620 when the movement of the first image 620 is complete.

Figure 7:
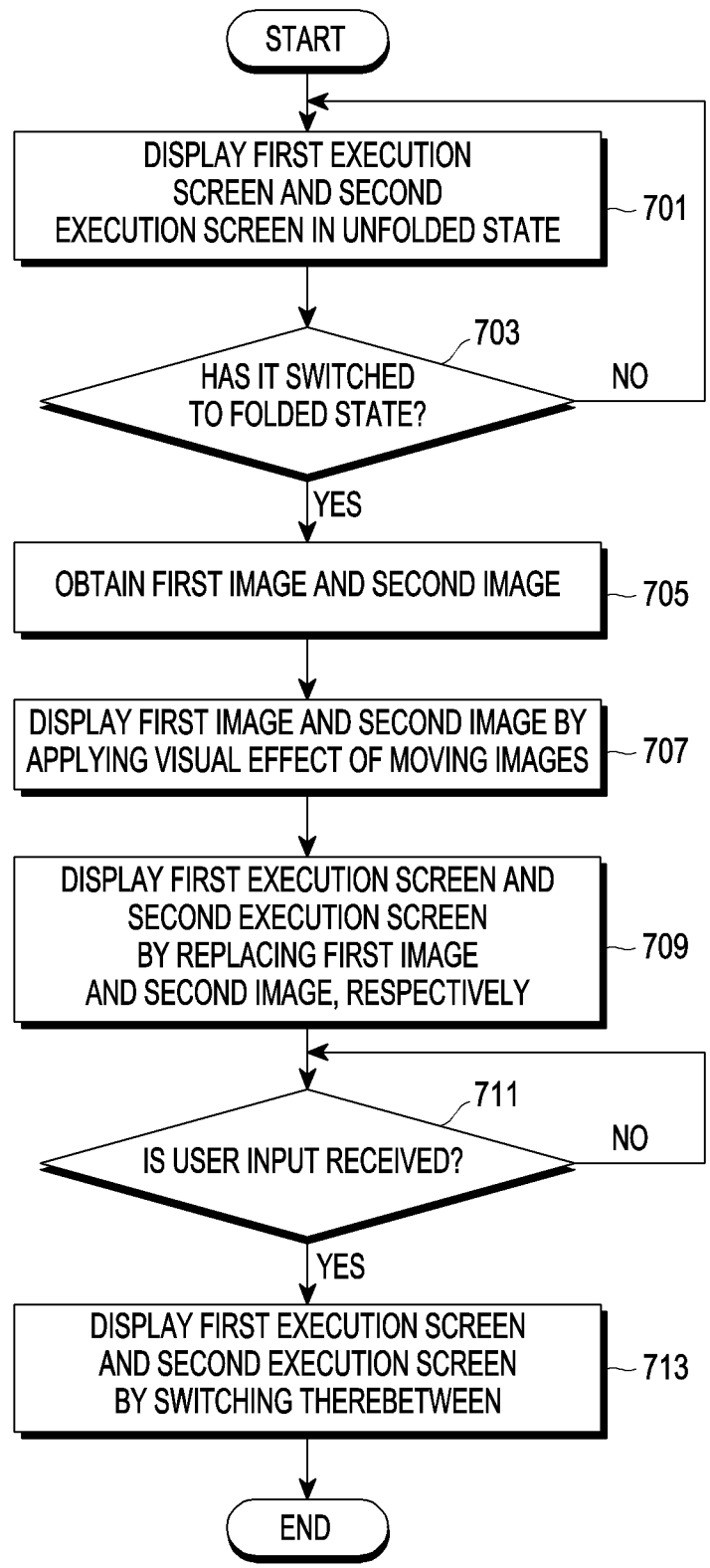
FIG. 7 is a diagram illustrating an example of an operation method in an electronic device according to an embodiment.

FIG. 7 is a diagram illustrating an example of an operation method in an electronic device according to an embodiment.

An electronic device 101 (e.g., the electronic device 101 in FIGS. 1, 2, 3A to 3C, 4A, and 4B) according to an embodiment, in the open, or unfolded state of a display (e.g., the display 161 in FIGS. 2, 3A to 3C, 4A, and 4B), may display respective execution screens of different applications on the first area (e.g., the first area (y2-y3) 161-1 in FIG. 4A), like multitasking (split view).

Referring to FIG. 7, in operation 701, the electronic device according to an embodiment may display a first execution screen of a first application on a first portion of the first area of the display of a display module (e.g., the display module 160 in FIGS. 1 and 2) and display a second execution screen of a second application on a second portion of the first area.

In operation 703, the electronic device may identify switching to the closed, or folded state. If the angle between a first housing structure (e.g., the first housing structure 210 in FIG. 2) and a second housing structure (e.g., the second housing structure 220 in FIG. 2) is identified to be less than a specified reference angle, the electronic device may identify switching to the closed or folded state. The angle maybe monitored using at least one sensor (e.g., a proximity sensor). If switching to the closed, or folded state is identified as a result of the identification, the electronic device may perform operation 705. On the other hand, if the state does not switch to the closed, or folded state, the electronic device may continue to perform operation 701.

In operation 705, in response to the switching to the closed, or folded state, the electronic device 101 may obtain a first image by photographing (e.g., capturing, screen recording, etc.) the first execution screen of the first application and obtain a second image by photographing (e.g., capturing, screen recording, etc.) the second execution screen of the second application. For example, the electronic device 101 may select a main screen to be displayed on the third area and a sub-screen to be displayed on the second area from among the first execution screen and the second execution screen displayed in the unfolded state. The execution screen selected as a main screen may be changed to have a second screen ratio, and the execution screen selected as a sub-screen may be changed to have a third screen ratio. For example, the electronic device may select, as the main screen, the execution screen selected by the user from among the first execution screen and the second execution screen, the execution screen onto which the last user input is made before switching to the folded state, or a focused execution screen. The second screen ratio may be smaller than the first screen ratio, and the third screen ratio may be smaller than the second screen ratio. Other relationships among the screen ratios are possible. For example, in the case where the first execution screen of the first application is focused, the electronic device may capture the focused first execution screen to obtain a first image at the second screen ratio (e.g., the size of the third area (0 to y1) 161-3 in FIG. 3A) and capture the non-focused second execution screen to obtain a second image at the third screen ratio (e.g., the size at the second area (y1 to y2) 161-2 in FIG. 3A).

In operation 707, the electronic device may display the first image and the second image in the folded state by applying a visual effect in which the first image and the second image move from the portions of the first area to the second area and the third area of the display, respectively. In some embodiments, the visual effect is depicted based on a specified speed. For example, the electronic device may display the first image by applying a visual effect (e.g., an animation effect) of moving the first image to the third area (e.g., the third area y1 to 0 in FIG. 3A) via the second area (e.g., the second area y2 to y1 in FIG. 3A). The electronic device may display the second image by applying a visual effect (e.g., an animation effect) of moving the second image to the second area (e.g., the second area y2 to y1 in FIG. 3A). The electronic device may move and arrange the first image obtained by capturing the focused first execution screen on an upper portion and the second image obtained by capturing the non-focused second execution screen on a lower portion following the first image, thereby sorting the display order.

In operation 709, based on completion of the movement of each of the first image and the second image, the electronic device may move and display a refreshed first execution screen replacing the first image and a refreshed second execution screen replacing the second image. For example, if the first execution screen is selected as a main screen and focused, the electronic device may move and display the first image on the third area, and move and display the second image aligned following with the first image on the second area. As another example, if the second execution screen is selected as a main screen and focused, the electronic device may align the second image on the upper portion, move and display the second image on the third area, and move and display the first image aligned with the second image on the second area.

In operation 711, the electronic device may identify whether or not a user input (e.g., a user input such as a designated gesture, touch, or voice) is received in the closed, or folded state. If the user input is received, in response, operation 713 may be performed. On the other hand, if the user input is not received, operation 711 may be continuously performed. For example, the electronic device may identify that user input such as a touch or a swipe is received in the non-focused second area.

In operation 713, the electronic device may display the first execution screen and the second execution screen by switching between them in the folded state. For example, if the first execution screen is focused as a main screen, the focus of the first execution screen displayed on the third area may be released, and the electronic device may display the first execution screen by switching from the third area to the second area. The first execution screen may be reduced corresponding to the screen ratio of the second area. The electronic device may set a focus while moving and displaying the second execution screen, as a sub-screen, displayed on the second area to the third area. The first execution screen may be enlarged corresponding to the screen ratio of the second area. As another example, if the second execution screen is focused as a main screen, the electronic device may display the second execution screen on the third area and display the first execution screen on the second area so that the focus of the second execution screen, as a main screen, displayed on the third area is released, thereby displaying the same by switching from the third area to the second area and so that a focus may be set on the first execution screen, as a sub-screen, displayed on the second area by moving and displaying the same to and on the third area.

FIGS. 8A, 8B, 8C and 8D are diagrams illustrating examples of displaying an execution screen depending on the state of an electronic device according to an embodiment.

Figure 8A:
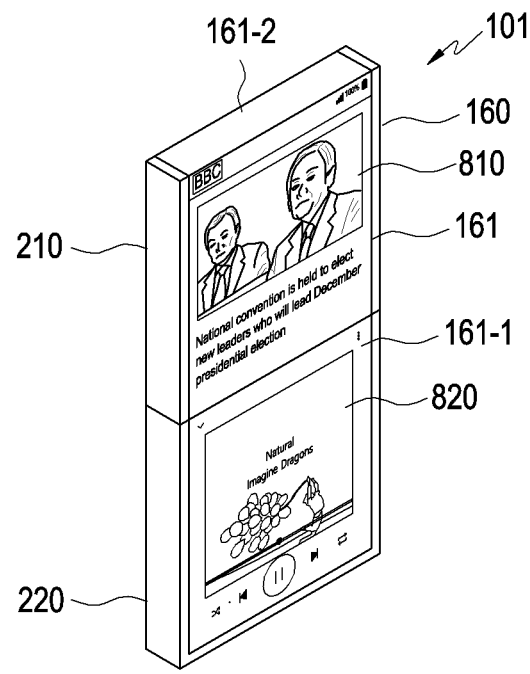
FIGS. 8A, 8B, 8C and 8D are a diagram illustrating an example of displaying an execution screen depending on the state of an electronic device according to an embodiment.

Referring to FIGS. 7 and 8A, 8B, 8C and 8D, an electronic device (e.g., the electronic device 101 in FIGS. 1 and 2) according to an embodiment, as shown in operation 701 in FIG. 7 and FIG. 8A, may display a first execution screen 810 of a first application on a first portion of the first area 161-1 of the display 161 included in the display module and display a second execution screen 820 of a second application on a second portion of the first area 161-1 in the unfolded state. For example, the first portion of the first area 161-1 may have a size corresponding to or similar to the size of the first housing structure 210, and the second portion of the first area 161-1 may have a size corresponding to or similar to the size of the second housing structure 220.

According to an embodiment, if the selected second execution screen 820 is selected as a main screen to be displayed on the third area 161-3 of the display 161 from among the first execution screen 810 and the second execution screen 820, a visual effect indicating that the selected second execution screen 820 is focused (e.g., displaying a bold line, displaying highlight, or displaying a specific mark) may be displayed.

Figure 8B:
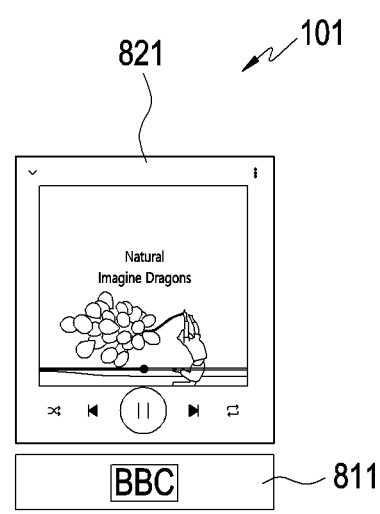

According to an embodiment, as shown in operation 705 in FIG. 7 and in FIG. 8B, if it is detected that the display 161 is being closed, or folded using at least one sensor, the electronic device 101 may capture the first execution screen 810 to obtain a first image 811 and capture the second execution screen 820 to obtain a second image 821. Here, the first image 811 is a sub-screen and may be produced by being reduced to the size of the third screen ratio so as to be moved to and displayed on the second area 161-2, and the second image 821 may be produced to have the size of the second screen ratio so as to be moved to and displayed on the third area 161-3.

According to an embodiment, as shown in operation 707 in FIG. 7 and in FIG. 8B, if it is detected that the display 161 is being closed, or folded using at least one sensor, the electronic device 101 may display the second image 821 obtained by capturing the second execution screen 820, which is a main screen, on the third area 161-3 at the second screen ratio by applying a visual effect of moving the same to the third area 161-3. Here, the second screen ratio may have a size corresponding to or similar to that of the third area 161-3. The electronic device 101 may display the first image 811 obtained by capturing the first execution screen 810, which is a sub-screen, on the second area 161-2 at the third screen ratio by applying a visual effect of moving the same to the second area 161-2. Here, the third screen ratio may have a size corresponding to or similar to that of the second area 161-2.

Figure 8C:
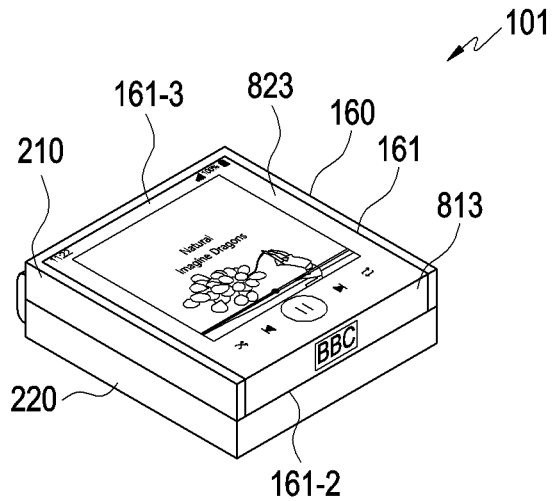

According to an embodiment, as shown in operation 709 in FIG. 7 and in FIG. 8C, if it is detected that the display 161 is in the fully closed, or folded state using at least one sensor, the electronic device 101 may display the first execution screen 813 at the third screen ratio by replacing the first image 811 displayed on the second area 161-2 and display the second execution screen 823 at the second screen ratio by replacing the second image 821 displayed on the third area 161-3.

Figure 8D:
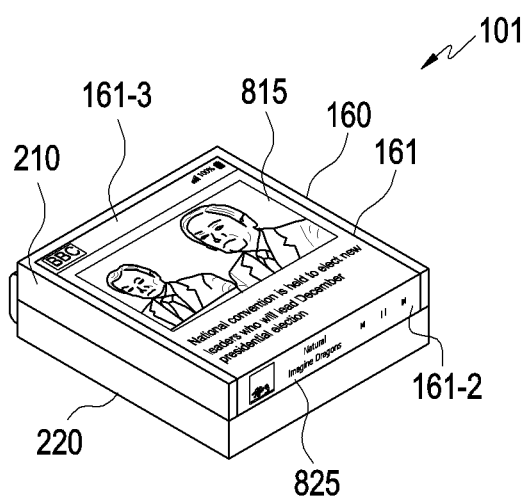

According to an embodiment, as shown in operation 713 in FIG. 7 and in FIG. 8D, if it is identified that a user input such as a touch or a swipe is received in the non-focused second area, the electronic device may display the first execution screen 813 and the second execution screen 823 by switching therebetween. The electronic device 101 may change the first execution screen 813 to have the second screen ratio and display the changed first execution screen 815 as a main screen on the third area 161-3, and may change the second execution screen 823 to have the third screen ratio and display the changed second execution screen 825 as a sub-screen on the second area 161-2. For example, the focus of the second execution screen 823 displayed on the third area 161-3 is released, and the electronic device 101 may move the second execution screen 825 from the third area 161-3 to the second area 161-2 and may display the second execution screen 825 reduced to the third screen ratio from on the second area 161-2. The electronic device 101 may move the first execution screen 813, as a sub-screen, displayed on the second area 161-2 to the third area 161-3 and display the first execution screen 815 enlarged to the second screen ratio from on the third area 161-3.

Figure 9:
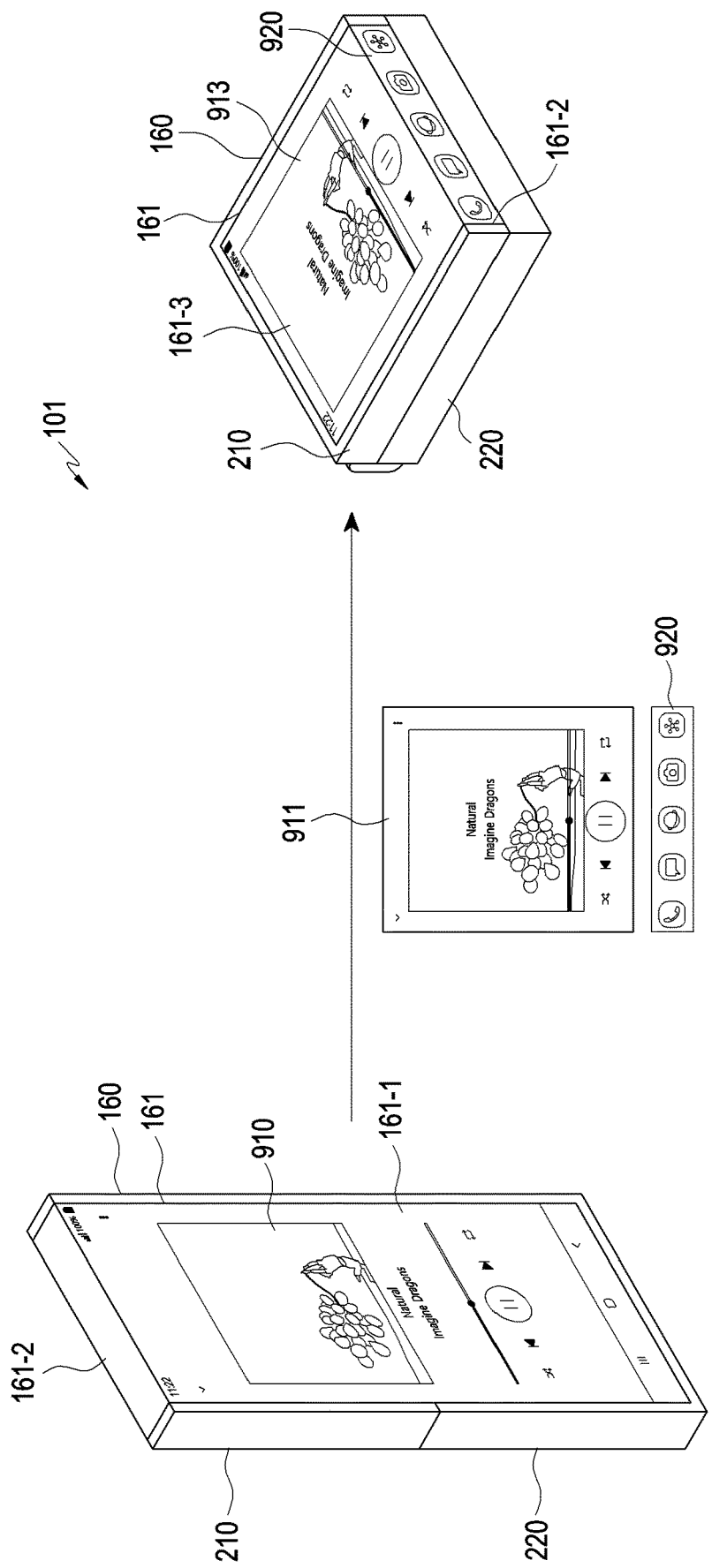
FIG. 9 is a diagram illustrating an example of displaying an execution screen depending on the state of an electronic device according to an embodiment.

FIG. 9 is a diagram illustrating an example of displaying an execution screen depending on the state of an electronic device according to an embodiment.

Referring to FIG. 9, an electronic device 101 (e.g., the electronic device 101 in FIGS. 1 and 2) according to an embodiment may display a first execution screen 910 of a first application on the first area 161-1 of the display 161 included in the display module 160 in the open, or unfolded state. If it is detected that the display 161 switches from the open, or unfolded state to the closed, or folded state using at least one sensor, the electronic device 101 may change the first execution screen 910 to have the second screen ratio and capture the changed first execution screen to obtain a first image 911. The electronic device 101 may set the first execution screen 910 as a main screen, move the first image 911 from the first area 161-1 to the third area 161-3 via the second area 161-2 of the display 161, and display the same thereon. The electronic device 101 may obtain a sub-screen 920 including content to be displayed on the second area 161-2 (e.g., a recently executed application, an application frequently executed by a user, content, weather, an execution icon indicating clock or notification, or a system indicator) and display the same on the second area 161-2. For example, the sub-screen 920 may be displayed on the second area 161-2 so as to appear gradually in response to the movement of the first image 911 or may be displayed when the first image 911 leaves the second area 161-2. As another example, if the first execution screen 910 is changed to have the second screen ratio, the electronic device may display the sub-screen 920 in the lower area of the first area 161-1 where the changed first execution screen is displayed, obtain an image by capturing the sub-screen 920, move the image obtained by capturing the sub-screen 920 according to the movement of the first image 911, and display the same on the second area 161-2.

According to an embodiment, if it is identified that the display 161 is in the fully closed, or folded state using at least one sensor, the electronic device 101 may display the first execution screen 913 on the third area 161-3 at the second screen ratio by replacing the first image 911 and display the sub-screen 920 on the second area 161-2 of the display 161. For example, when the image obtained by capturing the sub-screen 920 is displayed on the second area 161-2, the sub-screen 920 may be displayed.

Figure 10A:
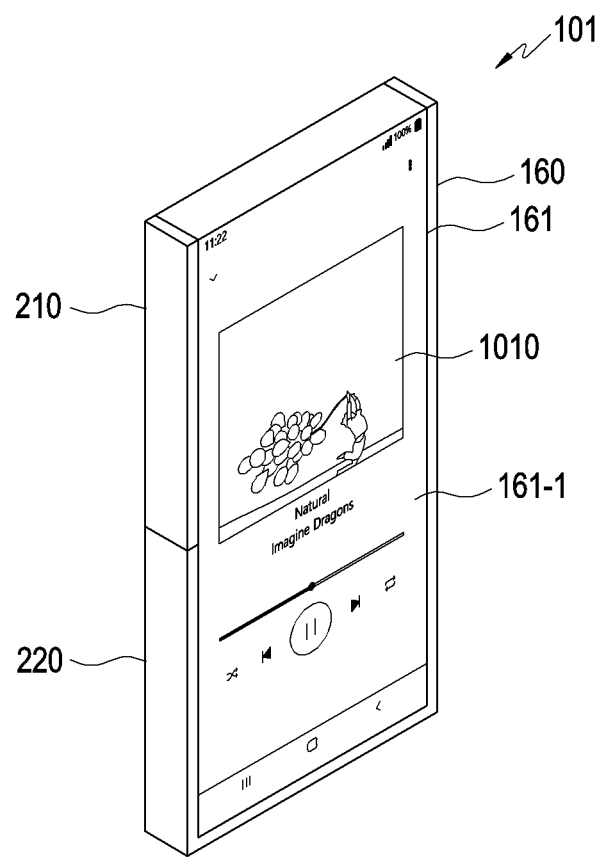
FIGS. 10A, 10B and 10C are a diagram illustrating an example of displaying an execution screen depending on the state of an electronic device according to an embodiment.
Figure 10B:
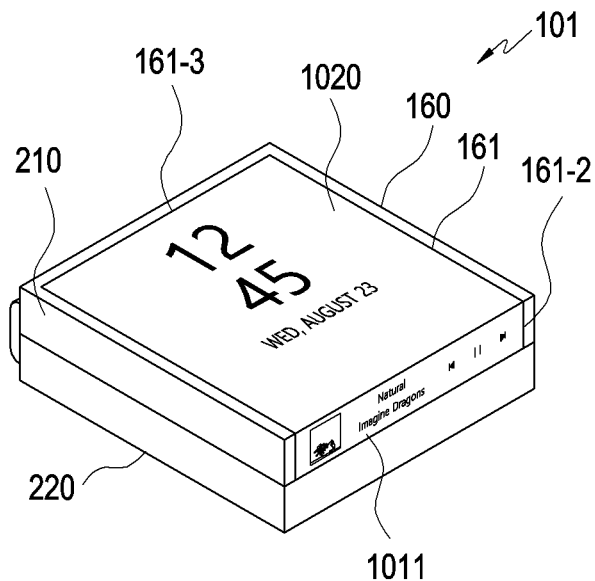
Figure 10C:
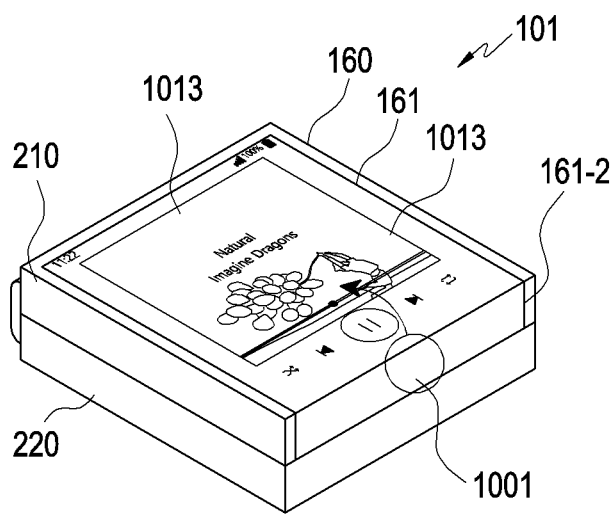

FIGS. 10A, 10B and 10C are diagrams illustrating an example of displaying an execution screen depending on the state of an electronic device according to an embodiment.

Referring to FIGS. 10A, 10B and 10C, an electronic device 101 (e.g., the electronic device 101 in FIGS. 1 and 2) according to an embodiment may display a first execution screen 1010 of a first application on the first area 161-1 of the display 161 included in the display module 160 in the open, or unfolded state as shown in FIG. 10A. As shown in FIG. 10B, if it is detected that the display 161 is closed, or folded state using at least one sensor and if a user performs selection to display an always-on display (AOD) execution screen on the third area 161-3, the electronic device 101 may produce a first image 1011 at the third screen ratio by capturing the first execution screen 1010 displayed on the first area 161-1. The execution screen is displayed as the always-on display (AOD) to an AOD image (1020). Further, the electronic device moves and displays the first image 1011 and the AOD image 1020 on the second area 161-2 and the third area 161-3, respectively, by applying a visual effect (e.g., an animation effect). In some embodiments, the third screen ratio may have a size corresponding to or similar to the second area 161-2 (e.g., the area y1-y2 in FIG. 3B). The electronic device 101 may display the first image 1011 at the third screen ratio on the second area 161-2 of the display 161 and display the AOD image on the third area 161-3. If it is detected that the display 161 is in the closed or fully folded state using at least one sensor, the electronic device 101 may display the first execution screen at the third screen ratio on the second area 161-2 by replacing the first image 1011. When the main screen is turned off after the display 161 completely switches to the closed, or folded state using at least one sensor and when the execution screens in the second area 161-2 and the third area 161-3 are turned off, the electronic device 101 may display an AOD on the third area 161-3.

According to an embodiment, as shown in FIG. 10C, when a user input (e.g., touch or drag) 1001 is received in the second area 161-2, the electronic device 101 may change the first execution screen at the third screen ratio displayed on the second area 161-2 to a first image 1013 at the second screen ratio and display the first image 1013 on the third area 161-3 by applying a visual effect of moving the image from the second area 161-2 to the third area 161-3. When the first image 1013 is completely moved to the third area 161-3, the electronic device 101 may display the first execution screen at the second screen ratio on the third area 161-3 by replacing the first image 1013. For example, when displaying the first execution screen at the second screen ratio on the third area 161-3, the electronic device 101 may display a screen of an always-on display (AOD) changed to have the third screen ratio on the second area 161-2.

Figure 11:
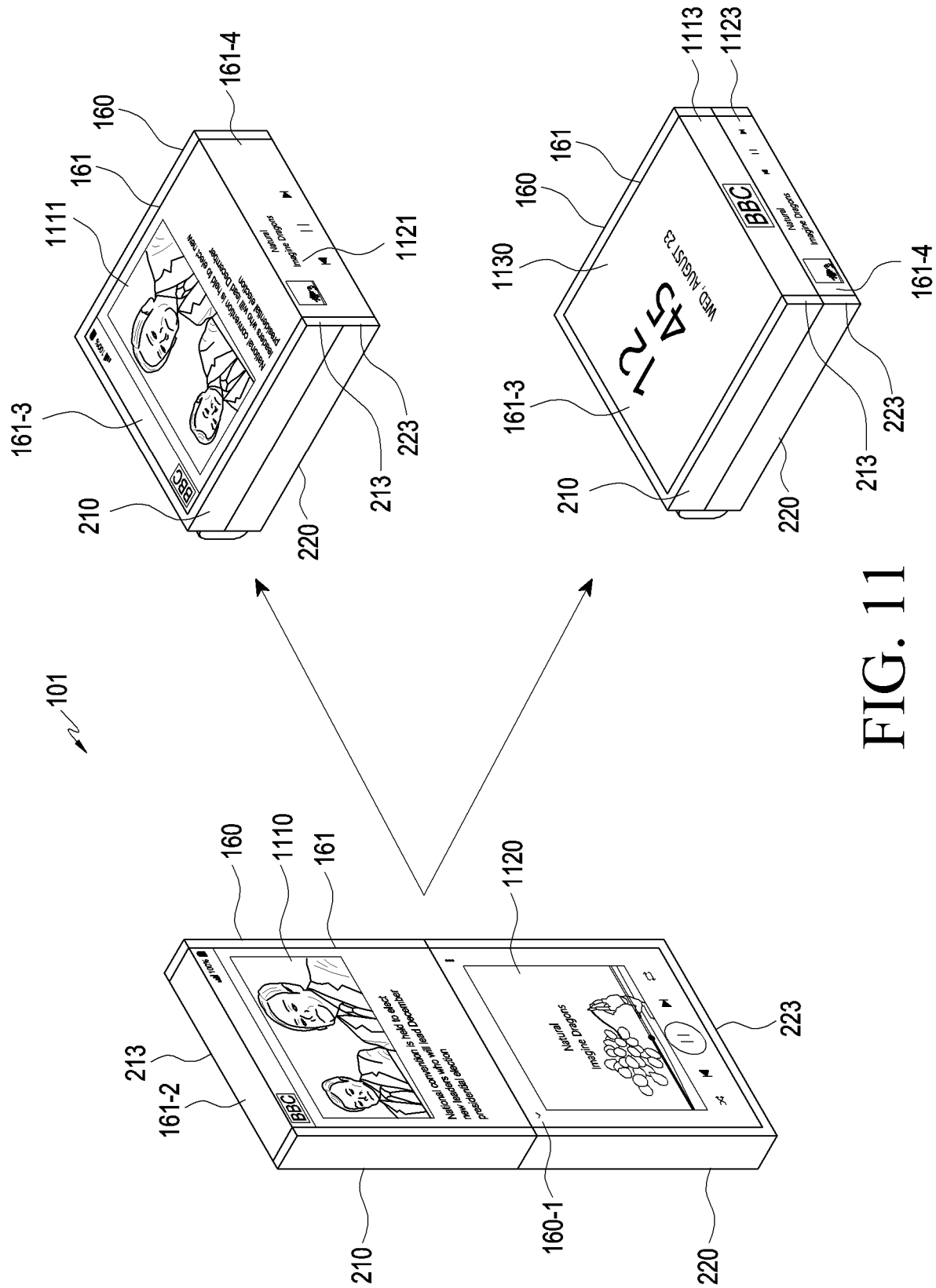
FIG. 11 is a diagram illustrating an example of displaying an execution screen depending on the state of an electronic device according to an embodiment.

FIG. 11 is a diagram illustrating an example of displaying an execution screen depending on the state of an electronic device according to an embodiment.

Referring to FIG. 11, an electronic device 101 (e.g., the electronic device 101 in FIGS. 1 and 2) according to an embodiment may display a first execution screen 1110 of a first application and a second execution screen 1120 of a second application on the first area 161-1 of the display 161 included in the display module 160 in the open, or unfolded state. If the first execution screen 1110 is focused as a main screen and if switching from the open, or unfolded state to the closed, folded state is detected using at least one sensor, the electronic device 101 may capture the first execution screen 1110 to obtain a first image 1111 and capture the second execution screen 1120 to obtain a second image 1121.

According to an embodiment, if switching from the open, or unfolded state to the closed, or folded state is detected using at least one sensor, the electronic device 101 may display the first image 1111 at the second screen ratio on the third area 161-3 by applying a visual effect of moving first image 1111 to the third area 161-3 via the second area 161-2 and display the second image 1121 at a fourth screen ratio on the fourth area 161-4 by applying a visual effect according to the movement and display of the first image 111. In some embodiments, the fourth screen ratio may have a size corresponding to or similar to the fourth area 161-4 of the display 161. The fourth area of the display 161 may include the second area 161-2 of the display 161, and a portion corresponding to the second area 161-2 may be disposed on the third surface 213 (e.g., the second surface 212 in FIGS. 2, 3A, 3B, and 3C) of the first housing structure 210. The remaining other portions may be disposed on the third surface 223 (e.g., the third surface 213 in FIGS. 2, 3A, 3B, and 3C) of the second housing structure 220.

According to an embodiment, if the electronic device 101 switches from the open, unfolded state to the closed, or folded state using at least one sensor and if an always-on display (AOD) is configured to be displayed on the third area 161-3 in the closed, or folded state, the electronic device 101 may display the first image 1113 at the third screen ratio by applying a visual effect of moving the same to a first portion of the fourth area 161-4 disposed on the first surface 213 (e.g., the second surface 212 in FIGS. 2, 3A, 3B, and 3C) of the first housing 210. The second image 1123 is displayed at the third screen ratio on a second portion of the fourth area 161-4 by applying a visual effect of moving the same to the second portion of the fourth area 161-4 disposed on the third surface 223 (e.g., the third surface 213 in FIGS. 2, 3A, 3B, and 3C) of the second housing structure 220. The image 1130 to be displayed as an AOD screen may be displayed on the third area 161-3 at the second screen ratio.

According to an embodiment, if it is detected that the display 161 is in the closed, or fully folded state using at least one sensor, the electronic device 101 may display the first execution screen at the third screen ratio on the first portion of the fourth area 161-4 by replacing the first image 1113. Further, the second execution screen is displayed at the third screen ratio on the second portion of the fourth area 161-4 by replacing the second image 1123.

According to an embodiment, when a user input (e.g., touch or drag) 1001 is received in the first portion of the fourth area 161-4, the electronic device 101 may move the image obtained by capturing the first execution screen at the third screen ratio displayed on the first portion of the fourth area 161-4 to the third area 161-3 by applying a visual effect of moving the same. In some embodiments, the image thereon is enlarged and displayed. The second execution screen at the third screen ratio displayed on the second portion of the fourth area 161-4 may be enlarged and displayed on the entire area of the fourth area 161-4, and the image 1130 to be displayed as an AOD screen may be removed. In some embodiments, the electronic device 101 may move the image obtained by capturing the first execution screen at the third screen ratio displayed on the first portion of the fourth area 161-4 to the third area 161-3 by applying a visual effect of moving the same. The electronic device may enlarge and display the image thereon. Further, the electronic device may reduce the image 1130 to be displayed as an AOD screen by applying a visual effect of moving the same to the first portion of the fourth area 161-4 and displaying the image on the first portion of the fourth area 161-4.

According to an embodiment, if a user input (e.g., touch, drag, etc.) 1001 is received in the second portion of the fourth area 161-4, the electronic device 101 may move the image obtained by capturing the second execution screen at the third screen ratio displayed on the second portion of the fourth area 161-4 to the third area 161-3 by applying a visual effect of moving the same, and enlarge and display the image thereon. The first execution screen at the third screen ratio displayed on the first portion of the fourth area 161-4 may be enlarged and displayed on the entire area of the fourth area 161-4, and the image 1130 to be displayed as an AOD screen may be removed. For example, the electronic device 101 may move the image obtained by capturing the second execution screen at the third screen ratio displayed on the second portion of the fourth area 161-4 to the third area 161-3 by applying a visual effect of moving the same, and enlarge and display the image thereon, and may reduce the image 1130 to be displayed as an AOD screen by applying a visual effect of moving the same to the second portion of the fourth area 161-4 and display the image on the second portion of the fourth area 161-4.

According to an embodiment, when the main screen is turned off after the display 161 completely switches to the closed, or folded state using at least one sensor and when the execution screens in the fourth area 161-4 are turned off, the electronic device 101 may display an AOD on the third area 161-3.

According to an embodiment, a method in an electronic device (e.g., the electronic device 101 in FIGS. 1 and 2) may include displaying a first execution screen of a first application at a first screen ratio on a first area of a flexible display (e.g., the display 161 in FIG. 2) of the electronic device in an open, or unfolded state of the electronic device. The method further includes changing the first screen ratio of the first execution screen into a second screen ratio, based on switching to a closed, or folded state of the electronic device. The method further includes obtaining a first image corresponding to the first execution screen changed to have the second screen ratio. The method further includes moving and displaying the first image on the third area by applying a visual effect of moving the first image from the first area to the third area of the display via the second area of the display. The method further includes, based on completion of the movement of the first image, displaying the first execution screen changed to have the second screen ratio on the third area by replacing the first image.

According to an embodiment, the first area of the display may be disposed on a first surface of a first housing structure (e.g., the first housing structure 210 in FIG. 2) and a first surface of a second housing structure (e.g., the second housing structure 220 in FIG. 1). The second area of the display may be disposed on a third surface of the first housing structure. The third area of the display may be disposed on a second surface of the first housing structure The closed, or folded state may be a state in which the housing is folded such that the first surface of the first housing structure and the first surface of the second housing structure face each other.

According to an embodiment, the method may further include displaying, on the second area, a screen including another execution screen related to the first application, a second execution screen of a second application, or an object (e.g., an execution icon or content including images, text, or symbols) related to at least one application in the folded state.

According to an embodiment, obtaining of the first image may include displaying the first execution screen of the first application at the first screen ratio on the first area in the unfolded state, displaying the first execution screen changed to use the second screen ratio on a portion of the first area, based on switching to the folded state. In some embodiments, the first image is obtained by capturing the first execution screen changed to use the second screen ratio using a camera module (e.g., the camera module 180 in FIG. 1) of the electronic device.

According to an embodiment, the method may further include displaying a second execution screen of a second application on a portion of the first area in the unfolded state. The method may further include changing the second execution screen to have a third screen ratio, based on switching to the folded state. The method may further include displaying a second image corresponding to the second execution screen changed to have the third screen ratio on the second area by applying a visual effect of moving the second image from the portion of the first area to the second area. The method may further include, based on completion of the movement of the second image to the second area, displaying the second execution screen changed to have the third screen ratio on the second area by replacing the second image.

According to an embodiment, the method may further include changing the first execution screen of the first application to use a third screen ratio and displaying the first execution screen of the first application changed to use the third screen ratio on the second area when a screen of an always-on display is displayed on the third area.

According to an embodiment, the method may further include changing the first execution screen of the first application to have a fourth screen ratio and displaying the first execution screen of the first application changed to have the fourth screen ratio on a fourth area of the display when a screen of an always-on display is displayed on the third area. The fourth area of the display may include the second area, wherein a portion of the fourth area corresponding to the second area may be disposed on a third surface of the first housing structure. The remaining other portions of the fourth area may be disposed on a third surface of the second housing structure.

According to an embodiment, the method may further include changing the first execution screen of the first application to have a third screen ratio and displaying the first execution screen of the first application changed to use the third screen ratio on a first portion of a fourth area of the display. The method may further include changing the second execution screen of the second application to have the third screen ratio and displaying the second execution screen of the application changed to use the third screen ratio on a second portion of the fourth area when a screen of an always-on display is displayed on the third area. The fourth area of the display may include the second area, wherein a portion of the fourth area corresponding to the second area may be disposed on a third surface of the first housing structure. The remaining other portions of the fourth area may be disposed on a third surface of the second housing structure.

According to an embodiment, the method may further include displaying the first image corresponding to the first execution screen displayed on the third area by moving the first image to the first area via the second area when switching from the folded state to the unfolded state. When the movement of the first image is complete, the first execution screen is displayed on the first area by replacing the first image. The first execution screen displayed on the third area may be displayed at the second screen ratio. The first execution screen displayed on the first area may be displayed at the first screen ratio.

According to an embodiment, a non-transitory recording medium for storing a program including instructions that cause, when executed by a processor of an electronic device, the electronic device to display a first execution screen of a first application at a first screen ratio on a first area of a flexible display of the electronic device in an unfolded state. The electronic device may obtain a first image corresponding to the first execution screen, based on switching to a folded state of the electronic device. The electronic device may display the first image by applying a visual effect of moving the first image from the first area to the third area of the display via the second area of the display. Based on completion of the movement of the first image, the electronic device may display the first execution screen on the third area by replacing the first image.

In addition, embodiments disclosed herein are provided merely to easily describe technical details of the disclosure and to help the understanding of the disclosure, and are not intended to limit the scope of the disclosure. Accordingly, the scope of the disclosure should be construed as including all modifications or various other embodiments based on the technical idea of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a housing comprising a first housing structure and a second housing structure;
   a display configured as a flexible display;
   at least one processor; and
   memory storing instructions that, when executed by the at least one processor, cause the electronic device to:
   control the display to display, on a first area of the display, a first execution screen of a first application at a first screen ratio corresponding to a size of the first area in an unfolded state of the electronic device;
   based on switching to a folded state of the electronic device, change the first screen ratio of the first execution screen into a second screen ratio corresponding to a size of a third area of the display;
   obtain a first image corresponding to the first execution screen changed to have the second screen ratio;
   control the display to display the first image on the third area by applying a visual effect of moving the first image from the first area to the third area via a second area of the display, and display the first execution screen changed to have the second screen ratio on the third area by replacing the first image; and
   based on switching from the folded state to the unfolded state, control the display to display, on the first area, the first image corresponding to the first execution screen displayed on the third area by applying a visual effect of moving the first image from the third area to the first area via the second area, and display the first execution screen changed to have the first screen ratio on the first area by replacing the first image.

2. The electronic device of claim 1, wherein the first area of the display is disposed on a first surface of the first housing structure and a first surface of the second housing structure,
the second area of the display is disposed on a third surface of the first housing structure and between the first area and the second area,
the third area of the display is disposed on a second surface of the first housing structure, and
the folded state is a state in which the housing is folded such that the first surface of the first housing structure and the first surface of the second housing structure face each other.

3. The electronic device of claim 1, wherein the instructions, when executed by the at least one processor individually or collectively, cause the electronic device to display, on the second area, a screen comprising another execution screen related to the first application, a second execution screen of a second application, or an object related to at least one application in the folded state.

4. The electronic device of claim 1, wherein the instructions, when executed by the at least one processor individually or collectively, cause the electronic device to:
control the display to display the first execution screen of the first application at the first screen ratio on the first area in the unfolded state,
based on switching to the folded state, control the display to display the first execution screen at the second screen ratio on a portion of the first area, and
obtain the first image by capturing the first execution screen at the second screen ratio.

5. The electronic device of claim 1, wherein the instructions, when executed by the at least one processor individually or collectively, cause the electronic device to:
control the display to display a second execution screen of a second application in a portion of the first area in the unfolded state,
based on switching to the folded state, change the second execution screen to have a third screen ratio,
control the display to display a second image corresponding to the second execution screen changed to have the third screen ratio in the second area by applying a visual effect of moving the second image from the portion of the first area to the second area, and
based on completion of the movement of the second image to the second area, control the display to display the second execution screen at the third screen ratio on the second area by replacing the second image.

6. The electronic device of claim 5, wherein the instructions, when executed by the at least one processor individually or collectively, cause the electronic device to control the display, in response to receiving a user input, to display the first execution screen displayed on the third area on the second area and to display the second execution screen displayed on the second area on the third area,
the first execution screen displayed on the second area is changed to have the third screen ratio, and
the second execution screen displayed on the third area is changed to have the second screen ratio.

7. The electronic device of claim 1, wherein the instructions, when executed by the at least one processor individually or collectively, cause the electronic device to control the display to change the first execution screen of the first application to have a third screen ratio and display the first execution screen of the first application changed to have the third screen ratio on the second area in response to the third area being configured to be an always-on display.

8. The electronic device of claim 1, wherein the instructions, when executed by the at least one processor individually or collectively, cause the electronic device to control the display to change the first execution screen of the first application to have a fourth screen ratio and display the first execution screen of the first application to have the fourth screen ratio on a fourth area of the display in response to the third area being an always-on display,
wherein the fourth area of the display comprises the second area,
wherein a portion of the fourth area corresponding to the second area is disposed on a third surface of the first housing structure, and
wherein the remaining other portions of the fourth area are disposed on a third surface of the second housing structure.

9. The electronic device of claim 1, wherein the instructions, when executed by the at least one processor individually or collectively, cause the electronic device to control the display to change the first execution screen of the first application to have a third screen ratio and display the first execution screen of the first application changed to have the third screen ratio on a first portion of a fourth area of the display, and to change a second execution screen of a second application to have the third screen ratio and display the second execution screen of the second application changed to have the third screen ratio on a second portion of the fourth area in response to the third area being configured as always-on display,
wherein the fourth area of the display comprises the second area,
wherein a portion of the fourth area corresponding to the second area is disposed on a third surface of the first housing structure, and
wherein the remaining other portions of the fourth area are disposed on a third surface of the second housing structure.

10. A method by an electronic device, the method comprising:
displaying, on a first area of a display of the electronic device, a first execution screen of a first application at a first screen ratio corresponding to a size of the first area in an unfolded state of the electronic device;
based on switching to a folded state of the electronic device, changing the first screen ratio of the first execution screen into a second screen ratio corresponding to a size of a third area of the display;
obtaining a first image corresponding to the first execution screen changed to the second screen ratio;
displaying the first image on the third area by applying a visual effect of moving the first image from the first area to the third area of the display via a second area of the display, and displaying the first execution screen changed to the second screen ratio on the third area by replacing the first image; and
based on switching from the folded state to the unfolded state, displaying, on the first area, the first image corresponding to the first execution screen displayed on the third area by applying a visual effect of moving the first image from the third area to the first area via the second area, and displaying the first execution screen changed to have the first screen ratio on the first area by replacing the first image.

11. The method of claim 10, wherein the first area of the display is disposed on a first surface of a first housing structure and a first surface of a second housing structure,
the second area of the display is disposed on a third surface of the first housing structure,
the third area of the display is disposed on a second surface of the first housing structure, and
the folded state is a state in which the housing is folded such that the first surface of the first housing structure and the first surface of the second housing structure face each other.

12. The method of claim 10, further comprising displaying, on the second area, a screen comprising another execution screen related to the first application, a second execution screen of a second application, or an object related to at least one application in the folded state.

13. The method of claim 10, wherein the obtaining of the first image comprises:
displaying the first execution screen of the first application at the first screen ratio on the first area in the unfolded state;
based on switching to the folded state, displaying the first execution screen changed to have the second screen ratio on a portion of the first area; and
obtaining the first image by capturing the first execution screen changed to have the second screen ratio using a camera module of the electronic device.

14. The method of claim 10, further comprising:
displaying a second execution screen of a second application on a portion of the first area in the unfolded state;
based on the switching to the folded state: changing the second execution screen to have a third screen ratio, displaying a second image corresponding to the second execution screen changed to have the third screen ratio on the second area by applying a visual effect of moving the second image from the portion of the first area to the second area; and
based on completion of the movement of the second image to the second area, displaying the second execution screen changed to have the third screen ratio on the second area by replacing the second image.

15. The method of claim 10, further comprising changing the first execution screen of the first application to have a third screen ratio and displaying the first execution screen of the first application changed to have the third screen ratio on the second area in response to the third area being set to be always-on.

16. The method of claim 10, further comprising changing the first execution screen of the first application to have a fourth screen ratio and displaying the first execution screen of the first application changed to have the fourth screen ratio on a fourth area of the display in response to the third area being set to be an always-on display portion,
wherein the fourth area of the display comprises the second area,
a portion of the fourth area corresponding to the second area is disposed on a third surface of the first housing structure, and
the remaining other portions of the fourth area are disposed on a third surface of the second housing structure.

17. The method of claim 10, further comprising changing the first execution screen of the first application to have a third screen ratio and displaying the first execution screen of the first application changed to have the third screen ratio on a first portion of a fourth area of the display, and changing a second execution screen of the second application to have the third screen ratio and displaying the second execution screen of the second application changed to have the third screen ratio on a second portion of the fourth area in response to the third area being an always-on display portion,
wherein the fourth area of the display comprises the second area,
a portion of the fourth area corresponding to the second area is disposed on a third surface of the first housing structure, and
the remaining other portions of the fourth area are disposed on a third surface of the second housing structure.

18. A non-transitory recording medium for storing a program comprising instructions that cause, when executed by a processor of an electronic device, the electronic device to:
display, on a first area of a display of the electronic device, a first execution screen of a first application at a first screen ratio corresponding to a size of the first area in an unfolded state of the electronic device;
based on switching to a folded state of the electronic device, change the first screen ratio of the first execution screen into a second screen ratio corresponding to a third area of the display ratio corresponding to a size of a third area of the display;
obtain a first image corresponding to the first execution screen changed to have the second screen ratio;
display the first image to and on the third area by applying a visual effect of moving the first image from the first area to the third area of the display via a second area of the display, and display the first execution screen changed to have the second screen ratio on the third area by replacing the first image; and
based on switching from the folded state to the unfolded state, display, on the first area, the first image corresponding to the first execution screen displayed on the third area by applying a visual effect of moving the first image from the third area to the first area via the second area, and display the first execution screen changed to have the first screen ratio on the first area by replacing the first image.

* * * * *